US008984739B2

(12) United States Patent
Shimazawa et al.

(10) Patent No.: US 8,984,739 B2
(45) Date of Patent: Mar. 24, 2015

(54) METHOD OF MANUFACTURING A THERMALLY-ASSISTED MAGNETIC RECORDING HEAD THAT SUPPRESSES PROTRUSION OF A PLASMON GENERATOR

(75) Inventors: Koji Shimazawa, Tokyo (JP); Yasutoshi Fujita, Hong Kong (CN); Tatsuya Shimizu, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 794 days.

(21) Appl. No.: 13/273,709

(22) Filed: Oct. 14, 2011

(65) Prior Publication Data

US 2013/0091695 A1    Apr. 18, 2013

(51) Int. Cl.
| | |
|---|---|
| G11B 5/31 | (2006.01) |
| G02B 6/122 | (2006.01) |
| B82Y 20/00 | (2011.01) |
| G11B 5/00 | (2006.01) |

(52) U.S. Cl.
CPC ............ *G11B 5/314* (2013.01); *G11B 5/3163* (2013.01); *G11B 5/3166* (2013.01); *G11B 5/3169* (2013.01); *G02B 6/1226* (2013.01); *B82Y 20/00* (2013.01); *G11B 2005/0021* (2013.01)
USPC .............. 29/603.12; 29/603.07; 29/603.15; 29/603.16; 369/13.32; 369/112.27; 360/59

(58) Field of Classification Search
CPC .... G11B 5/314; G11B 5/3163; G11B 5/3166; G11B 5/3169; G11B 2005/0021; G02B 6/1226
USPC .............. 29/603.07–603.09, 603.12, 603.15, 29/603.16; 369/13.32, 112.27; 360/59; 356/445
See application file for complete search history.

(56) References Cited

U.S. PATENT DOCUMENTS

| 6,768,556 B1 | 7/2004 | Matsumoto et al. |
| 7,930,817 B2 * | 4/2011 | Takayama et al. ......... 29/603.09 |
| 2010/0103553 A1 | 4/2010 | Shimazawa et al. |

FOREIGN PATENT DOCUMENTS

JP    2009170057 A  *  7/2009

* cited by examiner

*Primary Examiner* — A. Dexter Tugbang
(74) *Attorney, Agent, or Firm* — Oliff PLC

(57) ABSTRACT

A method of manufacturing a thermally-assisted magnetic recording head includes the steps of: forming a preliminary head section that has a surface to be polished and includes a magnetic pole, a waveguide, and a preliminary plasmon generator; causing a volumetric expansion of the preliminary plasmon generator with heat by introducing light into the core of the waveguide of the preliminary head section; and polishing the surface to be polished of the preliminary head section into a medium facing surface. The preliminary plasmon generator has an end face located in the surface to be polished. In the step of polishing the surface to be polished, the surface to be polished is subjected to polishing with the preliminary plasmon generator expanded in volume, whereby the end face of the preliminary plasmon generator is polished into the front end face, and the preliminary plasmon generator thereby becomes the plasmon generator.

3 Claims, 14 Drawing Sheets

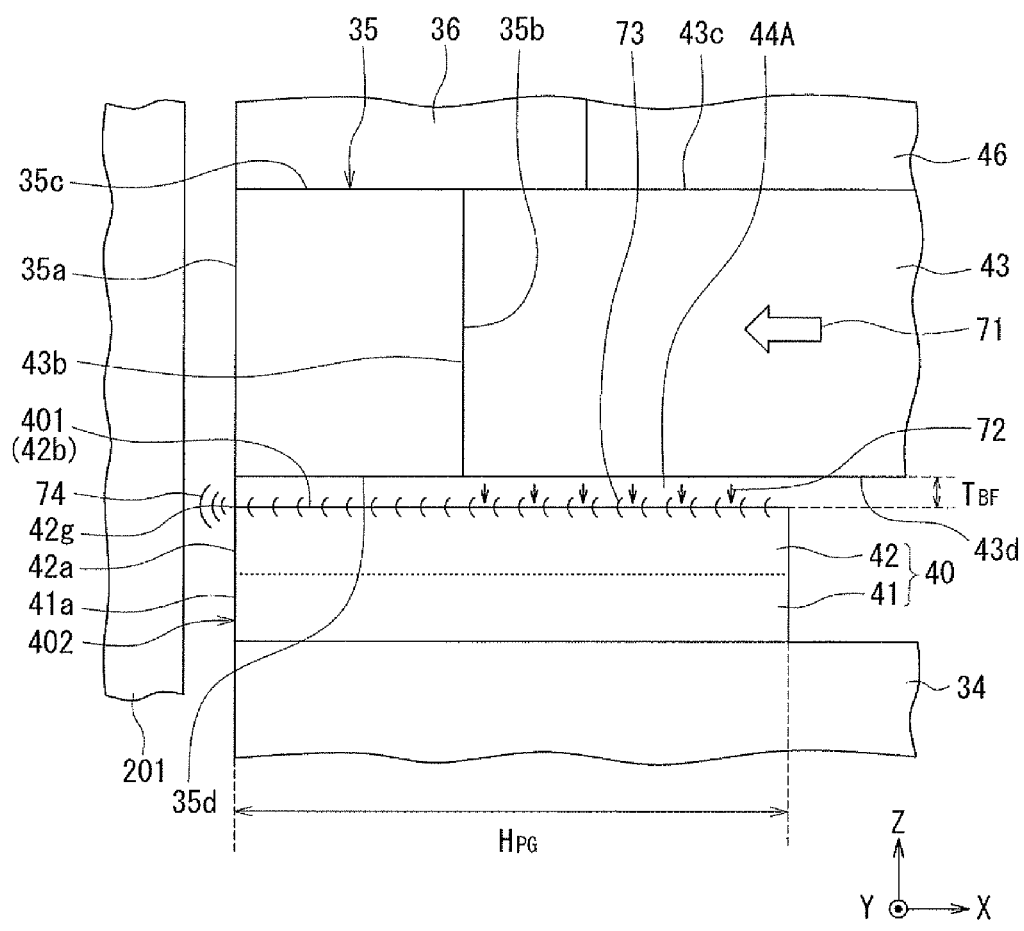
F I G. 2

METHOD OF MANUFACTURING A THERMALLY-ASSISTED MAGNETIC RECORDING HEAD THAT SUPPRESSES PROTRUSION OF A PLASMON GENERATOR

BACKGROUND OF THE INVENTION

1. Field of the Invention

The present invention relates to a method of manufacturing a thermally-assisted magnetic recording head that includes a waveguide and a plasmon generator.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are simultaneously applied to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with laser light. U.S. Pat. No. 6,768,556 discloses a method of exciting plasmons by directly irradiating the plasmon generator with light.

However, the plasmon generator that generates near-field light by direct irradiation with light is known to exhibit very low efficiency of transformation of the applied light into near-field light. The energy of the light applied to the plasmon generator is mostly reflected off the surface of the plasmon generator, or transformed into thermal energy and absorbed by the plasmon generator. The plasmon generator is small in volume since the size of the plasmon generator is set to be smaller than or equal to the wavelength of the light. The plasmon generator therefore shows a significant increase in temperature when it absorbs the thermal energy. As a result, there arises the problem that the plasmon generator melts.

To address this problem, as disclosed in, for example, U.S. Patent Application Publication No. 2010/0103553 A1, there has been proposed such a technique that the surface of the core of the waveguide provided in the slider and the surface of the plasmon generator are arranged to face each other with a gap therebetween, so that evanescent light that occurs from the surface of the core based on the light propagating through the core is used to excite surface plasmons on the plasmon generator to generate near-field light based on the surface plasmons.

The aforementioned technique allows the plasmon generator to be increased in volume to some extent, and prevents the plasmon generator from excessively increasing in temperature because the plasmon generator is not directly irradiated with the light propagating through the core.

Even with the aforementioned technique, however, an increase in temperature of the plasmon generator still occurs because part of the energy of the light propagating through the core is transformed into heat in the plasmon generator. The increase in temperature causes a volumetric expansion of the plasmon generator. The aforementioned technique serves to retard the increase in temperature of the plasmon generator and reduces the coefficient of volumetric expansion of the plasmon generator. However, the plasmon generator has a large volume, so that the amount of volumetric expansion of the plasmon generator is somewhat large. An expansion of the volume of the plasmon generator causes the plasmon generator to protrude from the medium facing surface, which is the surface of the thermally-assisted magnetic recording head to face the magnetic recording medium. As a result, the end portion of the read head section located in the medium facing surface becomes farther from the magnetic recording medium. This renders the servo signal unreadable during write operations.

OBJECT AND SUMMARY OF THE INVENTION

It is an object of the present invention to provide a method of manufacturing a thermally-assisted magnetic recording head that includes a waveguide and a plasmon generator, the method being capable of preventing the plasmon generator from protruding from the medium facing surface due to an increase in temperature of the plasmon generator.

A thermally-assisted magnetic recording head to be manufactured by the manufacturing method of the present invention includes: a medium facing surface that faces a magnetic recording medium; a magnetic pole; a waveguide; and a plasmon generator. The magnetic pole produces a write magnetic field for writing data on the magnetic recording medium. The waveguide includes a core through which light propagates, and a cladding that surrounds the core. The core has an evanescent light generating surface that generates evanescent light based on the light propagating through the core. The plasmon generator has an outer surface that includes a plasmon exciting part and a front end face. The plasmon exciting part faces the evanescent light generating surface with a predetermined spacing therebetween. The front end face is located in the medium facing surface. The front end face includes a near-field light generating part that generates near-field light. The plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

The method of manufacturing the thermally-assisted magnetic recording head of the present invention includes the steps of forming a preliminary head section that has a surface to be polished and includes the magnetic pole, the waveguide, and a preliminary plasmon generator; causing a volumetric expansion of the preliminary plasmon generator with heat by introducing light into the core of the waveguide of the preliminary head section; and polishing the surface to be polished of the preliminary head section into the medium facing surface. The preliminary plasmon generator has an end face that is located in the surface to be polished. In the step of polishing the surface to be polished, the surface to be polished is subjected to polishing with the preliminary plasmon generator expanded in volume, whereby the end face of the preliminary plasmon generator is polished into the front end face, and the preliminary plasmon generator thereby becomes the plasmon generator.

In the method of manufacturing the thermally-assisted magnetic recording head of the present invention, the preliminary plasmon generator is preferably made to have a temperature of 400° C. or less in the step of causing a volumetric expansion of the preliminary plasmon generator.

In the method of manufacturing the thermally-assisted magnetic recording head of the present invention, the plasmon generator may be formed of one of Au, Ag, and Cu.

According to the method of manufacturing the thermally-assisted magnetic recording head of the present invention, the step of causing a volumetric expansion of the preliminary plasmon generator is performed such that light is introduced into the core of the waveguide to transform part of the energy of the light propagating through the core into heat in the preliminary plasmon generator. The heat causes an increase in temperature of the preliminary plasmon generator, thereby allowing the preliminary plasmon generator to expand in volume. Then, in the step of polishing the surface to be polished, the surface to be polished is subjected to polishing with the preliminary plasmon generator expanded in volume. This allows the end face of the preliminary plasmon generator to be polished into the front end face. The plasmon generator that is completed in such a manner is lower in density than a plasmon generator that is completed by polishing the surface to be polished without introducing light into the core of the waveguide. The present invention thus makes it possible to suppress an expansion in volume of the plasmon generator induced by an increase in temperature of the plasmon generator during use of the thermally-assisted magnetic recording head. Consequently, the present invention makes it possible to prevent the plasmon generator from protruding from the medium facing surface due to an increase in temperature of the plasmon generator.

Other and further objects, features and advantages of the present invention will appear more fully from the following description.

BRIEF DESCRIPTION OF THE DRAWINGS

FIG. 2 is a cross-sectional view showing the core of a waveguide, a plasmon generator, and a magnetic pole in the thermally-assisted magnetic recording head according to the first embodiment of the invention.

DETAILED DESCRIPTION OF THE PREFERRED EMBODIMENTS

First Embodiment

Figure 3:
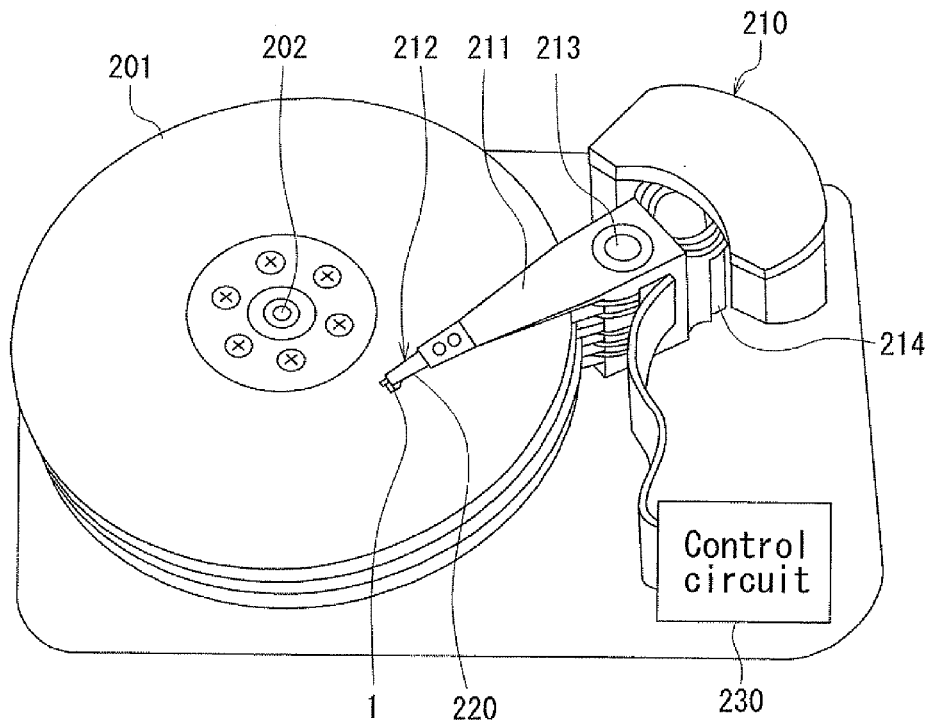
FIG. 3 is a perspective view showing a magnetic recording device of the first embodiment of the invention.

Preferred embodiments of the present invention will now be described in detail with reference to the drawings. First, reference is made to FIG. 3 to describe a magnetic disk drive that functions as a magnetic recording device of a first embodiment of the invention. As shown in FIG. 3, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 4:
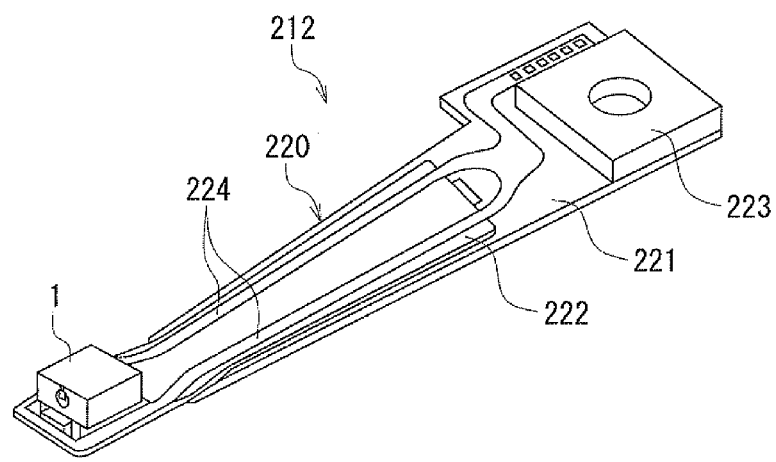
FIG. 4 is a perspective view showing a head gimbal assembly of the first embodiment of the invention.

FIG. 4 is a perspective view showing the head gimbal assembly 212 of FIG. 3. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The head gimbal assembly of the present invention is not limited to one having the configuration shown in FIG. 4.

Figure 5:
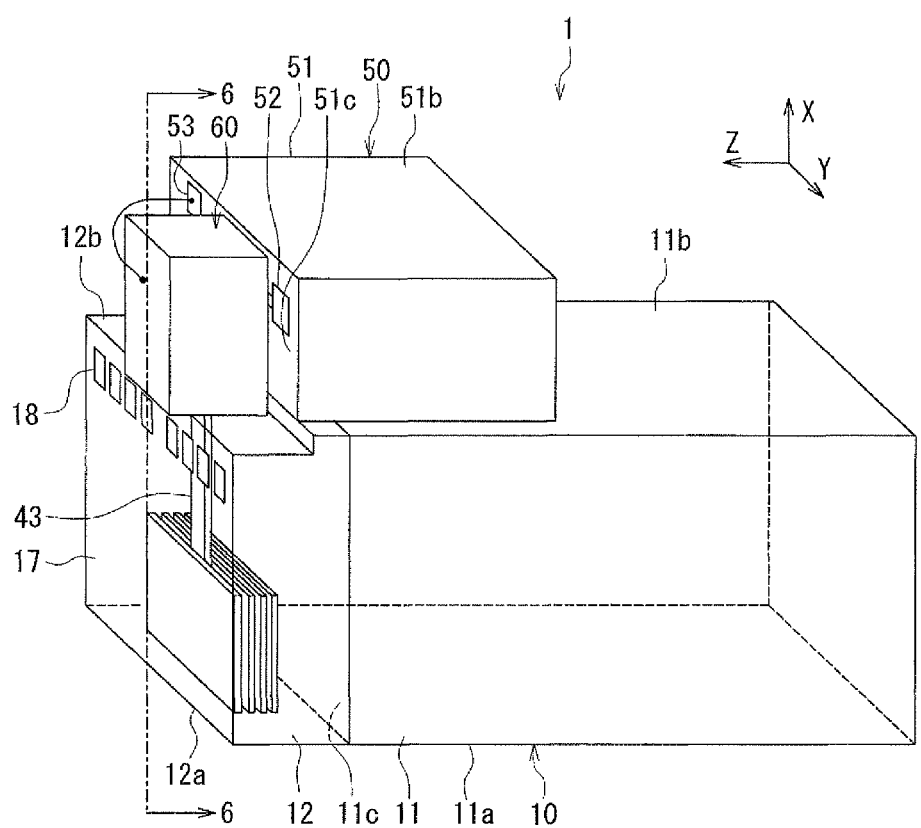
FIG. 5 is a perspective view showing the thermally-assisted magnetic recording head according to the first embodiment of the invention.
Figure 6:
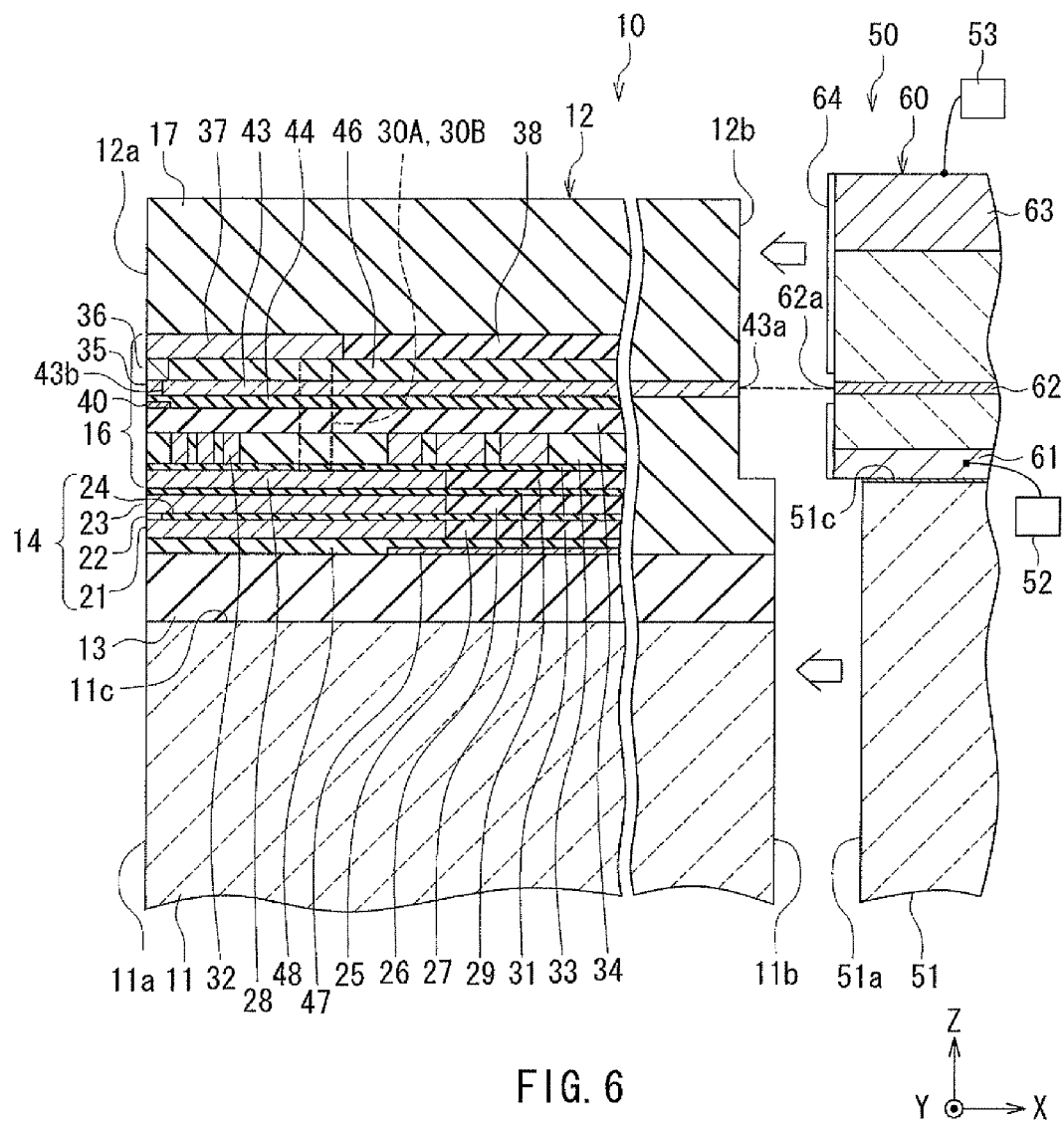
FIG. 6 shows a cross section taken along line 6-6 of FIG. 5.

The configuration of the thermally-assisted magnetic recording head 1 according to the present embodiment will now be described with reference to FIG. 5 and FIG. 6. FIG. 5 is a perspective view showing the thermally-assisted magnetic recording head 1. FIG. 6 shows a cross section taken along line 6-6 of FIG. 5. The thermally-assisted magnetic recording head 1 includes a slider 10 and a light source unit 50. FIG. 6 shows a state where the slider 10 and the light source unit 50 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 6. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is parallel to the Y direction.

The light source unit 50 includes a laser diode 60 serving as a light source for emitting laser light, and a support member 51 that is in the shape of a rectangular solid and supports the laser diode 60. The support member 51 is made of, for example, a ceramic material such as aluminum oxide-titanium carbide ($Al_2O_3$—TiC). The support member 51 has a bond surface 51a, a rear surface 51b opposite to the bond surface 51a, and four surfaces connecting the bond surface 51a to the rear surface 51b. One of the four surfaces connecting the bond surface 51a to the rear surface 51b is a light source mount surface 51c. The bond surface 51a is the surface to be bonded to the rear surface 11b of the slider substrate 11. The light source mount surface 51c is perpendicular to the bond surface 51a and parallel to the element-forming surface 11c. The laser diode 60 is mounted on the light source mount surface 51c. The support member 51 may function as a heat sink for dissipating heat generated by the laser diode 60, as well as serving to support the laser diode 60.

As shown in FIG. 6, the head section 12 includes: an insulating layer 13 disposed on the element-forming surface 11c; a heater 47 disposed on the insulating layer 13; an insulating layer 48 disposed to cover the insulating layer 13 and the heater 47; and a read head section 14, a write head section 16, and a protective layer 17 that are stacked in this order on the insulating layer 48. The insulating layers 13 and 48 and the protective layer 17 are each made of an insulating material such as $Al_2O_3$, which may hereinafter be referred to as alumina.

The heater 47 generates heat for causing part of the medium facing surface 12a to protrude. The components of the head section 12 expand with the heat generated by the heater 47, thereby causing part of the medium facing surface 12a to protrude. The heater 47 is made of a conductive material, such as metal, which generates heat when energized. The heater 47 is formed of, for example, a film of NiCr or a layered film consisting of Ta, NiCu, and Ta films. The amount of protrusion of the part of the medium facing surface 12a can be controlled by adjusting the magnitude of the current passed through the heater 47.

The read head section 14 includes: a bottom shield layer 21 disposed on the insulating layer 48; an MR element 22 disposed on the bottom shield layer 21; a top shield layer 23 disposed on the MR element 22; an insulating layer 24 disposed between the bottom shield layer 21 and the top shield layer 23 and surrounding the MR element 22; an insulating layer 25 disposed around the bottom shield layer 21; and an insulating layer 26 disposed around the top shield layer 23. The bottom shield layer 21 and the top shield layer 23 are each made of a soft magnetic material. The insulating layers 24 to 26 are each made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 27 disposed over the top shield layer 23 and the insulating layer 26. The insulating layer 27 is made of an insulating material such as alumina.

The write head section 16 is for use in perpendicular magnetic recording. The write head section 16 includes a return yoke layer 28 disposed on the insulating layer 27, and an insulating layer 29 disposed on the insulating layer 27 and surrounding the return yoke layer 28. The return yoke layer 28 is made of a soft magnetic material. The return yoke layer 28 has an end face located in the medium facing surface 12a. The top surfaces of the return yoke layer 28 and the insulating layer 29 are even with each other.

The write head section 16 further includes: two coupling portions 30A and 30B located away from the medium facing surface 12a and disposed on part of the return yoke layer 28; an insulating layer 31 disposed over another part of the return yoke layer 28 and the insulating layer 29; and a coil 32 disposed on the insulating layer 31. The coupling portions 30A and 30B are made of a soft magnetic material. Each of the coupling portions 30A and 30B includes a first layer disposed on the return yoke layer 28, and a second and a third layer stacked in this order on the first layer. The first layer of the coupling portion 30A and the first layer of the coupling portion 30B are arranged to align in the track width direction TW. The coil 32 is planar spiral-shaped and wound around the first layers of the coupling portions 30A and 30B. The coil 32 produces a magnetic field corresponding to data to be written on the magnetic disk 201. The coil 32 is made of a conductive material such as copper.

The write head section 16 further includes an insulating layer 33 disposed around the coil 32 and in the space between every adjacent turns of the coil 32, and an insulating layer 34 disposed over the coil 32 and the insulating layer 33. The first layers of the coupling portions 30A and 30B are embedded in the insulating layers 31 and 33. The second layers of the coupling portions 30A and 30B are embedded in the insulating layer 34.

The write head section 16 further includes a plasmon generator 40 disposed on the insulating layer 34 in the vicinity of the medium facing surface 12a. The plasmon generator 40 is made of a conductive material such as a metal. For example, the plasmon generator 40 may be made of one element selected from the group consisting of Au, Ag, Cu, and Al, or of an alloy composed of two or more of these elements. The plasmon generator 40 will be described in more detail later.

The write head section 16 further includes a magnetic pole 35 disposed above the plasmon generator 40, and a coupling layer 36 disposed on the magnetic pole 35. Each of the magnetic pole 35 and the coupling layer 36 has a front end face located in the medium facing surface 12a, a rear end face opposite to the front end face, a bottom surface, a top surface, and two side surfaces. The bottom surface of the coupling layer 36 is in contact with the top surface of the magnetic pole 35. The magnetic pole 35 is made of a soft magnetic material, or a magnetic metal material in particular. The coupling layer 36 is made of a soft magnetic material. The magnetic pole 35 will be described in more detail later.

The write head section 16 further includes a waveguide including a core 43 and a cladding. The cladding surrounds the core 43. The core 43 extends in the direction perpendicular to the medium facing surface 12a (the X direction). The core 43 has an incidence end 43a, and an end face 43b that faces toward the medium facing surface 12a and is located at a distance from the medium facing surface 12a. The core 43 propagates laser light that is emitted from the laser diode 60 and incident on the incidence end 43a. The plasmon generator 40 and the core 43 are arranged to align in the direction of travel of the magnetic disk 201 (the Z direction). The magnetic pole 35 is disposed between the end face 43b of the core 43 and the medium facing surface 12a.

Figure 1:
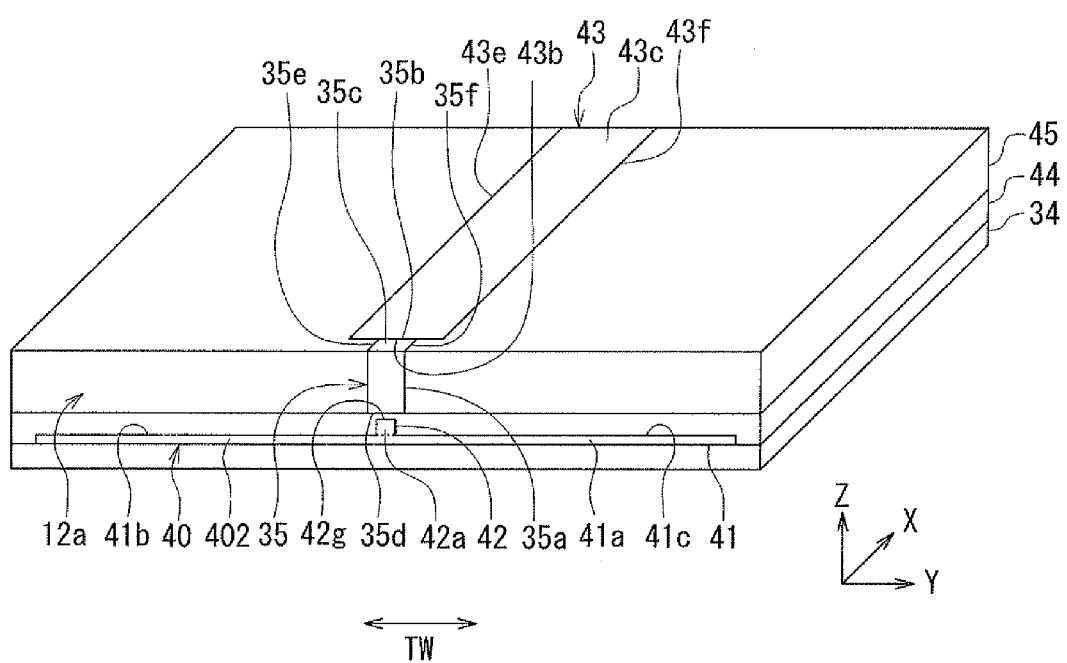
FIG. 1 is a perspective view showing the main part of a thermally-assisted magnetic recording head according to a first embodiment of the invention.

The cladding includes cladding layers 44, 45, and 46. The cladding layer 44 is disposed on the insulating layer 34 to cover the plasmon generator 40. The magnetic pole 35 and the core 43 are disposed on the cladding layer 44. The cladding layer 45 is disposed on the cladding layer 44 and surrounds the magnetic pole 35 and the core 43. The cladding layer 45 is not shown in FIG. 6 but is shown in FIG. 1, which will be described later. The cladding layer 46 is disposed over the core 43 and the cladding layer 45 and surrounds the coupling layer 36.

The core 43 is made of a dielectric material that transmits the laser light. Each of the cladding layers 44, 45 and 46 is made of a dielectric material and has a refractive index lower than that of the core 43. For example, if the laser light has a wavelength of 600 nm and the core 43 is made of $Al_2O_3$ (refractive index n=1.63), the cladding layers 44, 45 and 46 may be made of $SiO_2$ (refractive index n=1.46). If the core 43 is made of tantalum oxide such as $Ta_2O_5$ (n=2.16), the cladding layers 44, 45 and 46 may be made of $SiO_2$ (n=1.46) or $Al_2O_3$ (n=1.63). The core 43 will be described in more detail later.

The third layers of the coupling portions 30A and 30B are embedded in the cladding layers 44, 45, and 46. The third layer of the coupling portion 30A and the third layer of the coupling portion 30B are located on opposite sides of the core 43 in the track width direction TW, each being spaced from the core 43.

The write head section 16 further includes a yoke layer 37 and an insulating layer 38. The yoke layer 37 is disposed over the coupling portions 30A and 30B, the coupling layer 36 and the cladding layer 46. The yoke layer 37 is in contact with the top surface of the coupling layer 36 at a position near the medium facing surface 12a, and in contact with the top surfaces of the coupling portions 30A and 30B at a position away from the medium facing surface 12a. The insulating layer 38 is disposed on the cladding layer 46 and surrounds the yoke layer 37. The yoke layer 37 is made of a soft magnetic material.

In the write head section 16, a magnetic path for passing a magnetic flux corresponding to the magnetic field produced by the coil 32 is formed by the return yoke layer 28, the coupling portions 30A and 30B, the yoke layer 37, the coupling layer 36, and the magnetic pole 35. The magnetic pole 35 has the front end face located in the medium facing surface 12a. The magnetic pole 35 allows the magnetic flux corresponding to the magnetic field produced by the coil 32 to pass, and produces a write magnetic field for writing data on the magnetic disk 201.

As shown in FIG. 6, the protective layer 17 is disposed to cover the write head section 16. As shown in FIG. 5, the head section 12 further includes a plurality of terminals 18 disposed on the top surface of the protective layer 17. The plurality of terminals 18 are electrically connected to the MR element 22, the coil 32 and the heater 47, and are also electrically connected to the plurality of pad-shaped terminals of the wiring member 224 shown in FIG. 4.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 6, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a.

The light source unit 50 further includes a terminal 52 disposed on the light source mount surface 51c and electrically connected to the lower electrode 61, and a terminal 53 disposed on the light source mount surface 51c and electrically connected to the upper electrode 63. These terminals 52 and 53 are electrically connected to the plurality of pad-shaped terminals of the wiring member 224 shown in FIG. 4. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 5 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is secured to the slider 10 by bonding the bond surface 51a of the support member 51 to the rear surface 11b of the slider substrate 11, as shown in FIG. 6. The laser diode 60 and the core 43 are positioned with respect to each other so that the laser light emitted from the laser diode 60 will be incident on the incidence end 43a of the core 43.

Reference is now made to FIG. 1 and FIG. 2 to describe an example of the shapes and the arrangement of the core 43, the plasmon generator 40, and the magnetic pole 35. FIG. 1 is a perspective view showing the main part of the thermally-assisted magnetic recording head 1. FIG. 2 is a cross-sectional view showing the core 43, the plasmon generator 40, and the magnetic pole 35. FIG. 2 shows a cross section perpendicular to the element-forming surface 11c (see FIG. 6) and the medium facing surface 12a.

The core 43 has a top surface 43c, an evanescent light generating surface 43d which is a bottom surface, and two side surfaces 43e and 43f, as well as the incidence end 43a and the end face 43b shown in FIG. 6. The evanescent light generating surface 43d generates evanescent light based on the light propagating through the core 43. The evanescent light generating surface 43d is perpendicular to the Z direction.

As shown in FIG. 1 and FIG. 2, the plasmon generator 40 has an outer surface that includes a plasmon exciting part 401 and a front end face 402. The plasmon exciting part 401 faces the evanescent light generating surface 43d of the core 43 with a predetermined spacing therebetween. The front end face 402 is located in the medium facing surface 12a. Surface plasmons are excited on the plasmon exciting part 401 through coupling with the evanescent light generated from the evanescent light generating surface 43d. As shown in FIG. 2, the cladding layer 44 has a portion interposed between the evanescent light generating surface 43d and the plasmon exciting part 401, and this portion of the cladding layer 44 forms a buffer part 44A that has a refractive index lower than that of the core 43.

As shown in FIG. 1 and FIG. 2, the plasmon generator 40 includes a base part 41, and a protruding part 42 that protrudes from the base part 41 toward the evanescent light generating surface 43d. The base part 41 is shaped like a flat plate, for example. In FIG. 1 and FIG. 2, the boundary between the base part 41 and the protruding part 42 is shown by a dotted line. The base part 41 has a front end face 41a located in the medium facing surface 12a, and two base surfaces 41b and 41c that face upward and are located on opposite sides of the protruding part 42 in the track width direction TW.

The protruding part 42 has: a front end face 42a located in the medium facing surface 12a; a flat surface 42b shaped like a band and elongated in the direction perpendicular to the medium facing surface 12a; and two side surfaces. The flat surface 42b faces toward the evanescent light generating surface 43d and is parallel to the evanescent light generating surface 43d. In the example shown in FIG. 1, the two side surfaces of the protruding part 42 are perpendicular to the element-forming surface 11c. The two side surfaces of the protruding part 42 may be inclined with respect to the direction perpendicular to the element-forming surface 11c. The plasmon exciting part 401 is formed of the flat surface 42b of the protruding part 42. As will be described later, the flat surface 42b allows plasmons to propagate.

The front end face 402 is composed of the front end face 41a of the base part 41 and the front end face 42a of the protruding part 42. The front end face 402 includes a near-field light generating part 42g that generates near-field light. More specifically, the near-field light generating part 42g is an end of the front end face 42a of the protruding part 42 intersecting the flat surface 42b of the protruding part 42, or refers to this end and a part thereof. The near-field light generating part 42g generates near-field light based on the surface plasmons excited on the plasmon exciting part 401.

As previously described, the plasmon generator 40 and the core 43 are arranged to align in the direction of travel of the magnetic disk 201 (the Z direction). In the present embodiment, the plasmon generator 40 is located backward of the core 43 along the direction of travel of the magnetic disk 201.

Here, as shown in FIG. 2, the dimension in the X direction (length) of the base part 41 will be represented by symbol $H_{PG}$. $H_{PG}$ falls within the range of 0.8 to 1.6 μm, for example. In the present embodiment, the protruding part 42 has a dimension in the X direction (length) equal to $H_{PG}$. The base part 41 has a dimension in the Y direction (width) of, for example, 0.3 to 30 μm. The base part 41 has a dimension in the Z direction (thickness) of, for example, 30 to 300 nm.

The difference in level between the flat surface 42b and each of the base surfaces 41b and 41c in the direction perpendicular to the element-forming surface 11c (the Z direction) falls within the range of 20 to 50 nm, for example. The flat surface 42b has a width in the track width direction TW (the Y direction) of, for example, 5 to 35 nm.

A portion of the core 43 in the vicinity of the plasmon generator 40 has a dimension in the Y direction (width) of, for example, 0.3 to 1 μm. The remaining portion of the core 43 may have a width greater than that of the portion of the core 43 in the vicinity of the plasmon generator 40. The portion of the core 43 in the vicinity of the plasmon generator 40 has a dimension in the Z direction (thickness) of, for example, 0.3 to 0.6 μm.

As shown in FIG. 2, the distance between the evanescent light generating surface 43d and the flat surface 42b of the plasmon generator 40 will be represented by symbol $T_{BF}$. $T_{BF}$ falls within the range of 10 to 80 nm, for example.

The magnetic pole 35 has a front end face 35a located in the medium facing surface 12a, a rear end face 35b opposite to the front end face 35a, a top surface 35c, a bottom surface 35d, and two side surfaces 35e and 35f. The magnetic pole 35 is rectangular-solid-shaped. The width of the magnetic pole 35 in the track width direction TW (the Y direction) is constant regardless of the distance from the medium facing surface 12a.

The shapes and the arrangement of the core 43, the plasmon generator 40 and the magnetic pole 35 are not limited to the foregoing example that has been described with reference to FIG. 1 and FIG. 2.

Reference is now made to FIG. 2 to describe the principle of generation of near-field light in the present embodiment and the principle of thermally-assisted magnetic recording using the near-field light. Laser light 71 emitted from the laser diode 60 propagates through the core 43 of the waveguide to reach the vicinity of the plasmon generator 40. Here, the laser light 71 is totally reflected at the evanescent light generating surface 43d. This causes evanescent light 72 to occur from the evanescent light generating surface 43d to permeate into the buffer part 44A. Then, surface plasmons 73 are excited on the plasmon exciting part 401 (the flat surface 42b) of the outer surface of the plasmon generator 40 through coupling with the evanescent light 72. The surface plasmons 73 propagate along the flat surface 42b to the near-field light generating part 42g. Consequently, the surface plasmons 73 concentrate at the near-field light generating part 42g, and near-field light 74 is generated from the near-field light generating part 42g based on the surface plasmons 73.

The near-field light 74 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

Figure 7:
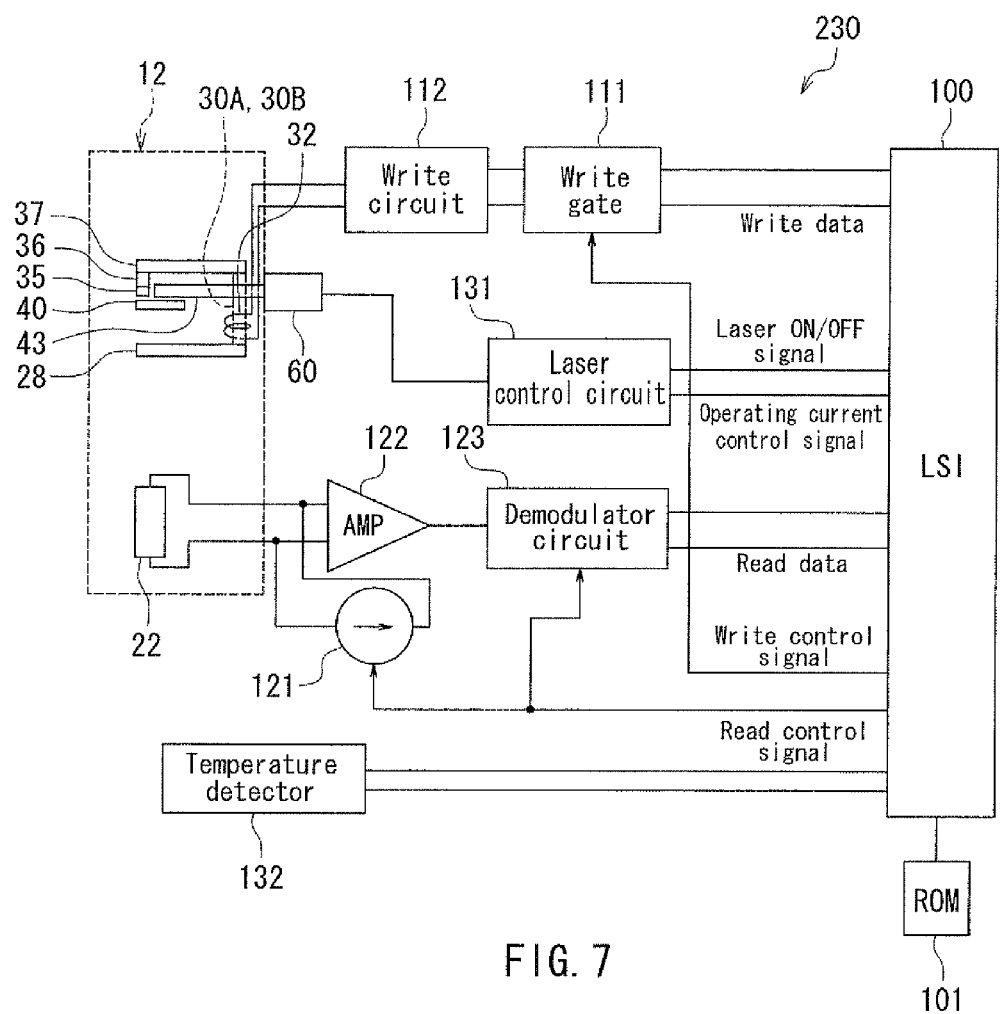
FIG. 7 is a block diagram showing the circuit configuration of the magnetic recording device of the first embodiment of the invention.

Reference is now made to FIG. 7 to describe the circuit configuration of the control circuit 230 shown in FIG. 3 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 32.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 32. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the core 43. Then, according to the principle of generation of near-field light described previously, the near-field light 74 is generated from the near-field light generating part 42g of the plasmon generator 40. The near-field light 74 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 74, and data that indicates the temperature dependence of the coercivity of the magnetic recording layer.

As shown in FIG. 7, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the control circuit 230 may have any configuration other than the configuration shown in FIG. 7.

Now, a description will be given of a method of manufacturing the thermally-assisted magnetic recording head 1 according to the present embodiment. The method of manufacturing the thermally-assisted magnetic recording head 1 includes the steps of: manufacturing the slider 10; and securing the light source unit 50 onto the slider 10. Here, a method of manufacturing the slider 10 will be described briefly. The method of manufacturing the slider 10 includes the steps of: fabricating a substructure including a plurality of rows of pre-slider portions 10P which are to become individual sliders 10 later; and producing a plurality of sliders 10 from the substructure. The substructure is fabricated by forming components of a plurality of sliders 10, except the slider substrates 11, on a substrate that includes portions to become the slider substrates 11 of the plurality of sliders 10.

In the step of producing a plurality of sliders 10, the substructure is first cut into a plurality of pre-slider portions 10P. Each pre-slider portion 10P is to become a slider 10 later. This step may form a plurality of pre-slider portions 10P separated from each other, or alternatively, a plurality of slider aggregates each of which includes a plurality of pre-slider portions aligned in a row. Now, by way of example, a description will be given for the case of forming a plurality of pre-slider portions 10P separated from each other. The cut surfaces of each pre-slider portion 10P are subjected to primary polishing into surfaces to be polished 11Pa and 12Pa. The surfaces to be polished 11Pa and 12Pa are to be subjected to secondary polishing later to become the medium facing surfaces 11a and 12a, respectively.

Figure 8A:
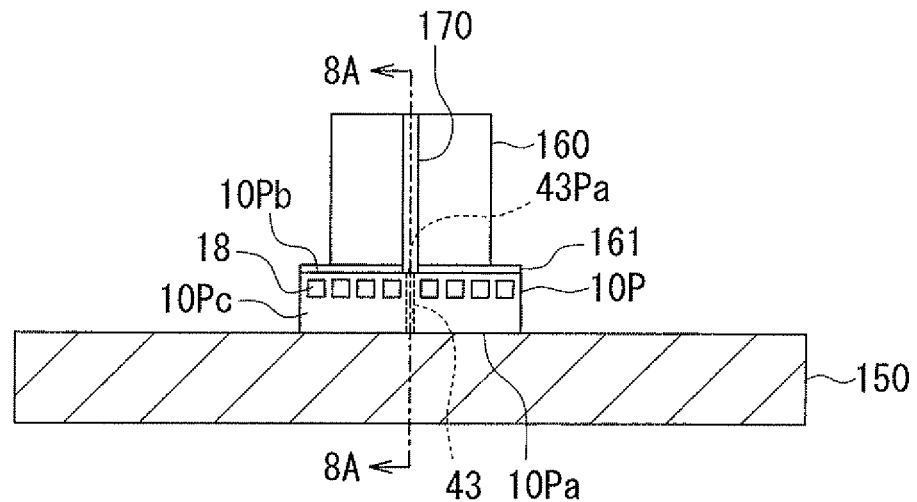
FIG. 8A and FIG. 8B are explanatory diagrams showing a step of a method of manufacturing the thermally-assisted magnetic recording head according to the first embodiment of the invention.
Figure 8B:
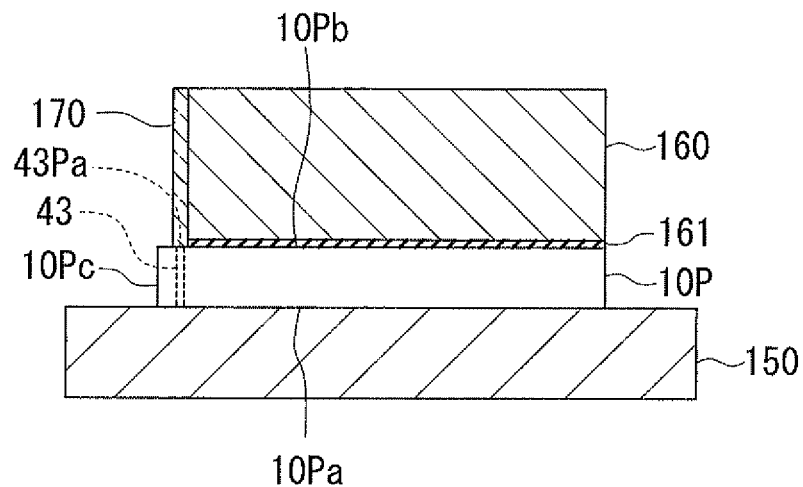
Figure 9:
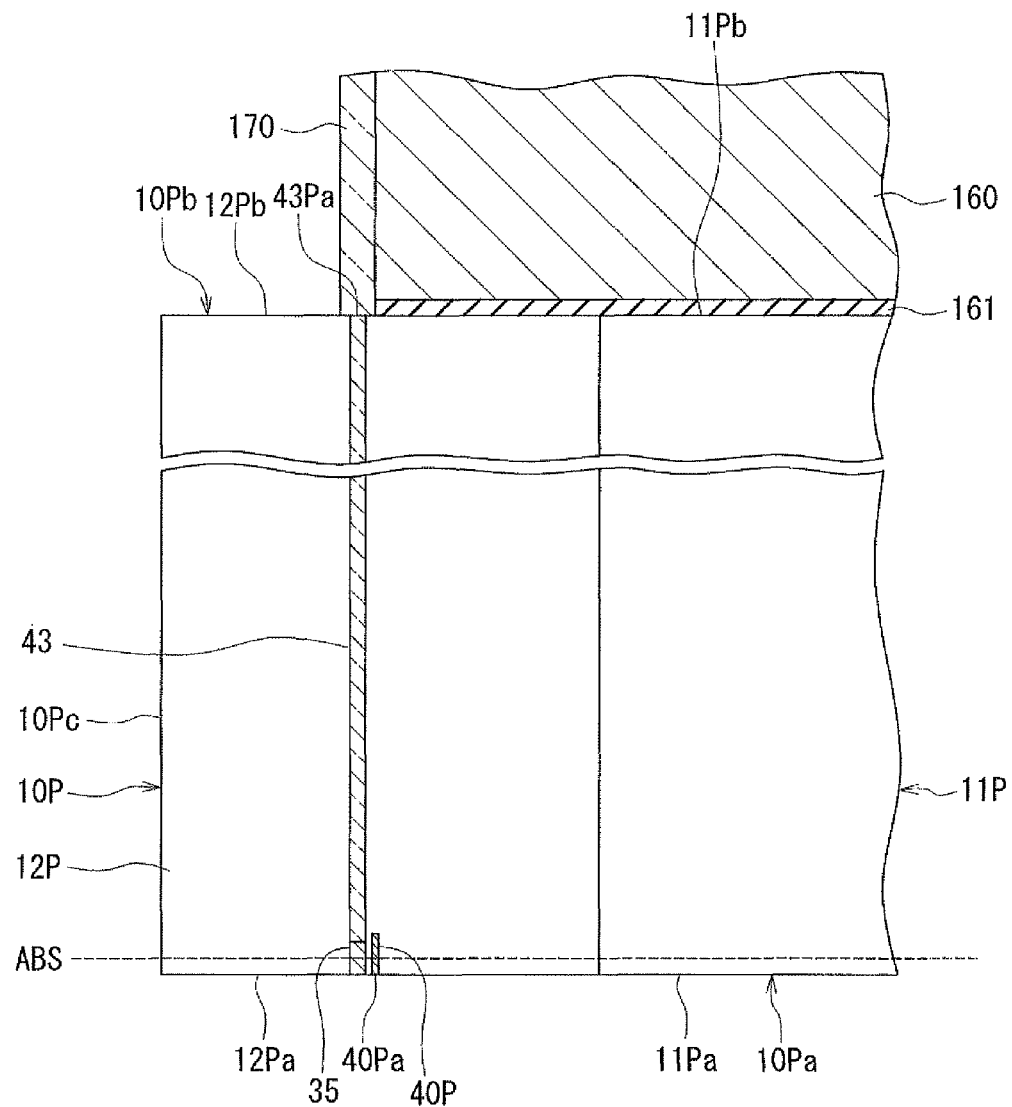
FIG. 9 is an enlarged cross-sectional view of part of FIG. 8B.

Reference is now made to FIG. 8A, FIG. 8B, and FIG. 9 to describe a step that follows the formation of the surfaces to be polished 11Pa and 12Pa. FIG. 8A is a front view illustrating the step following the formation of the surfaces to be polished 11Pa and 12Pa. FIG. 8B shows a cross section taken along line 8B-8B of FIG. 8A. FIG. 9 is an enlarged cross-sectional view of part of FIG. 8B. In FIG. 9, symbol ABS indicates the position at which the medium facing surfaces 11a and 12a are to be formed. For example, the surfaces to be polished 11Pa and 12Pa are at a distance of about 0.1 μm from the position at which the medium facing surfaces 11a and 12a are to be formed.

As shown in FIG. 8A, FIG. 8B, and FIG. 9, the pre-slider portion 10P has a surface 10Pa that includes the surfaces to be polished 11Pa and 12Pa, and a surface 10Pb opposite to the surface 10Pa. The pre-slider portion 10P further has a surface 10Pc formed of the top surface of the protective layer 17 (see FIG. 5 and FIG. 6). The surface 10Pb includes surfaces 11Pb and 12Pb which are to later become the rear surfaces 11b and 12b, respectively.

The pre-slider portion 10P includes a preliminary slider substrate 11P which is to later become the slider substrate 11, and a preliminary head section 12P which is to later become the head section 12. The preliminary slider substrate 11P has the surface to be polished 11Pa and the surface 11Pb mentioned above. The preliminary head section 12P has the surface to be polished 12Pa and the surface 12Pb mentioned above. The preliminary head section 12P includes the magnetic pole 35, the waveguide (the core 43 and the cladding), and a preliminary plasmon generator 40P which is to later become the plasmon generator 40. The preliminary plasmon generator 40P has an end face 40Pa located in the surface to be polished 12Pa (the surface 10Pa). The core 43 has a preliminary incidence end 43Pa located in the surface 12Pb (the surface 10Pb). The plurality of terminals 18 are disposed on the surface 10Pc.

The step shown in FIG. 8A, FIG. 8B, and FIG. 9 uses a polishing apparatus that has a lapping plate (platen) 150, for example. The lapping plate 150 has a top surface. The polishing apparatus may be such that the top surface of the lapping plate 150 comes into contact with a target to be polished, or that the top surface of the lapping plate 150 has a pad attached thereto and the pad comes into contact with the target to be polished.

The pre-slider portion 10P, the target to be polished, is held by a jig 160 disposed above the top surface of the lapping plate 150. The jig 160 has a bottom surface facing toward the top surface of the lapping plate 150, and a top surface opposite to the bottom surface. The pre-slider portion 10P is configured to be held by the jig 160 with the surface 10Pb attached to the bottom surface of the jig 160 with an attaching material 161, so that the surface 10Pa comes into contact with the top surface of the lapping plate 150 or the pad. The attaching material 161 may be wax or rubber, for example.

The jig 160 is provided with an optical fiber 170 that extends in the vertical direction. The optical fiber 170 has an upper end serving as an incidence end and a lower end serving as an emission end. The lower end of the optical fiber 170 is positioned to be opposed to the preliminary incidence end 43Pa of the core 43 of the preliminary head section 12P. Although not illustrated, a laser diode serving as a light source for emitting laser light is mounted on the top surface of the jig 160. The laser light emitted from the laser diode is to be incident on the upper end of the optical fiber 170.

In the step shown in FIG. 8A, FIG. 8B, and FIG. 9, first, the laser light emitted from the aforementioned laser diode is allowed to be incident on the upper end of the optical fiber 170 and exit from the lower end of the optical fiber 170 to be incident on the preliminary incidence end 43Pa of the core 43. In this manner, the laser light is introduced into the core 43.

The laser light introduced into the core 43 as described above causes surface plasmons to be excited on the preliminary plasmon generator 40P on the principle described with reference to FIG. 2. Here, part of the energy of the laser light propagating through the core 43 is transformed into heat in the preliminary plasmon generator 40P. The heat causes an increase in temperature of the preliminary plasmon generator 40P, thereby expanding the volume of the preliminary plasmon generator 40P. As a result, the end face 40Pa of the preliminary plasmon generator 40P located in the surface to be polished 12Pa protrudes outwardly relative to the remaining part of the surface to be polished 12Pa. This is the step of causing a volumetric expansion of the preliminary plasmon generator 40P. In this step, the preliminary plasmon generator 40P may be allowed to expand in volume until the preliminary plasmon generator 40P is plastically deformed.

With the preliminary plasmon generator 40P expanded in volume, the surfaces to be polished 11Pa and 12Pa (the surface 10Pa) are then subjected to secondary polishing. This step corresponds to the step of polishing the surface to be polished, according to the invention. This step will now be referred to as the secondary polishing step. In the secondary polishing step, a load is applied to the jig 160 with a not-shown actuator. The secondary polishing step is performed so that the surfaces 11Pa and 12Pa having undergone the polishing are aligned with the position ABS at which the medium facing surfaces 11a and 12a are to be formed. The medium facing surfaces 11a and 12a are thereby formed. By polishing the surface to be polished 12Pa, the end face 40Pa of the preliminary plasmon generator 40P is polished into the front end face 40-2, and the preliminary plasmon generator 40P thereby becomes the plasmon generator 40.

Then, the pre-slider portion 10P is released from the jig 160. After that, the surface 12Pb is processed into the rear surface 12b. The slider 10 is thus completed.

In the step of causing a volumetric expansion of the preliminary plasmon generator 40P, the aforementioned increase in temperature of the preliminary plasmon generator 40P causes an increase in temperature of the magnetic pole 35 located near the preliminary plasmon generator 40P. An excessive increase in temperature of the magnetic pole 35 may cause the magnetic pole 35 to be exposed to a high-temperature and high-humidity environment and thereby corroded. To avoid this situation, the preliminary plasmon generator 40P is preferably made to have a temperature of 400° C. or less in the step of causing a volumetric expansion of the preliminary plasmon generator 40P.

The step of causing a volumetric expansion of the preliminary plasmon generator 40P may be performed entirely prior to or during the secondary polishing step, or may be performed at a timing at which this step temporally overlaps the secondary polishing step. In the case where the preliminary plasmon generator 40P is allowed to expand in volume until the preliminary plasmon generator 40P is plastically deformed, the surfaces to be polished 11Pa and 12Pa (the surface 10Pa) are polished in the secondary polishing step with the preliminary plasmon generator 40P expanded in volume even if the step of causing a volumetric expansion of the preliminary plasmon generator 40P is performed entirely prior to the secondary polishing step.

The effects of the method of manufacturing the thermally-assisted magnetic recording head 1 according to the present embodiment will now be described. As described above, the method of manufacturing the thermally-assisted magnetic recording head 1 according to the present embodiment includes the steps of: forming the preliminary head section 12P having the surface to be polished 12Pa and including the magnetic pole 35, the waveguide and the preliminary plasmon generator 40P; causing a volumetric expansion of the preliminary plasmon generator 40P with heat by introducing light into the core 43 of the waveguide of the preliminary head section 12P; and polishing the surface to be polished 12Pa into the medium facing surface 12a.

In the step of causing a volumetric expansion of the preliminary plasmon generator 40P, laser light is introduced into the core 43, whereby part of the energy of the laser light propagating through the core 43 is transformed into heat in the preliminary plasmon generator 40P. The heat causes an increase in temperature of the preliminary plasmon generator 40P, thereby allowing the preliminary plasmon generator 40P to expand in volume. In the step of polishing the surface to be polished 12Pa, the surface to be polished 12Pa is subjected to polishing with the preliminary plasmon generator 40P expanded in volume. Consequently, the end face 40Pa of the preliminary plasmon generator 40P is polished into the front end face 40-2, and the preliminary plasmon generator 40P thereby becomes the plasmon generator 40.

The plasmon generator 40 is completed in this manner. This allows the plasmon generator 40 to have a lower density as compared with a case where the plasmon generator 40 is completed by polishing the surface 12Pa without introducing laser light into the core 43 and without causing a volumetric expansion of the preliminary plasmon generator 40P. The reasons for this are as follows. First, a volumetric expansion of the preliminary plasmon generator 40P with heat causes the preliminary plasmon generator 40P to become lower in density than before undergoing the volumetric expansion. Under this condition, the end face 40Pa is polished to complete the plasmon generator 40. When the laser light is stopped being introduced into the core 43, the temperature of the preliminary plasmon generator 40P decreases to cause a shrinkage of the preliminary plasmon generator 40P. However, the preliminary plasmon generator 40P cannot shrink enough to recover the original density before the volumetric expansion because of the constraint by the surrounding layers. As a result, the plasmon generator 40 of the present embodiment has a density lower than the density of the preliminary plasmon generator 40P before the volumetric expansion and lower than the density of a plasmon generator 40 that is completed by polishing the surface 12Pa without causing a volumetric expansion of the preliminary plasmon generator 40P.

According to the present embodiment, the reduced density of the plasmon generator 40 described above serves to suppress a volumetric expansion of the plasmon generator 40 induced by an increase in temperature of the plasmon generator 40 during use of the thermally-assisted magnetic recording head 1. As a result, according to the present embodiment, it is possible to prevent the plasmon generator 40 from protruding from the medium facing surface 12a due to an increase in temperature of the plasmon generator 40.

Now, a description will be given of experimental results demonstrating that the method of manufacturing the thermally-assisted magnetic recording head 1 according to the present embodiment provides the aforementioned advantageous effects. For the experiment, a head of a first type and a head of a second type were actually fabricated. The head of the first type includes a plasmon generator 40 that was completed by employing the method of manufacturing the thermally-assisted magnetic recording head 1 according to the present embodiment. The head of the second type includes a plasmon generator 40 that was completed by polishing the surface 12Pa without introducing laser light into the core 43. For each head, the read output and the amount of protrusion of the plasmon generator 40 during use were investigated.

The experiment was conducted using a spin stand, a measurement device connected to the spin stand, and a magnetic disk. The spin stand includes a device for rotating the magnetic disk and a device for positioning the head relative to the magnetic disk. The magnetic disk used for the experiment was one having a size of 2.5 inches and including a magnetic recording layer that has a coercivity of 20 kOe (1 Oe=79.6 A/m) or higher at room temperatures. In the experiment, the magnetic disk was rotated at 5400 rpm. The MR element 22 of each of the heads of the first and second types was a TMR element. In the experiment, the MR element 22 was driven at a voltage of 120 mV. The plasmon generators 40 of the heads of the first and second types were formed of three types of materials: Au, Ag, and Cu.

In the experiment, the amount of protrusion of the plasmon generator 40 was determined as follows. First, with the coil 32, the heater 47 and the laser diode 60 inactivated, the magnetic disk was rotated to cause the head to fly over the surface of the magnetic disk. Then, the spacing between the medium facing surface 12a and the surface of the magnetic disk was measured with an optical sensor. Hereinafter, the spacing between the medium facing surface 12a and the surface of the magnetic disk will be referred to as the flying height. The flying height obtained with the coil 32, the heater 47 and the laser diode 60 inactivated will be referred to as the initial flying height. The initial flying height is about 20 nm.

With the coil 32 and the laser diode 60 inactivated, the value of the power supplied to the heater 47 was then increased in a predetermined stepwise manner from zero so as to gradually increase the amount of protrusion of part of the medium facing surface 12a, and the value of the power (in mW) at which the medium facing surface 12a came into contact with the surface of the magnetic disk was determined. Hereinafter, this power value will be denoted as RTD. To determine RTD, the contact of the medium facing surface 12a with the surface of the magnetic disk was detected with an acoustic emission (AE) sensor included in the measurement device.

The initial flying height divided by RTD can be considered as the amount of reduction in the flying height per power value 1 mW supplied to the heater 47. Hereinafter, the initial flying height divided by RTD will be referred to as the spacing adjustment amount.

Next, with the heater 47 inactivated, the coil 32 and the laser diode 60 were supplied with predetermined currents. Note that the conditions employed for driving the coil 32 and the laser diode 60 (or the values of the currents supplied to the coil 32 and the laser diode 60) were pre-optimized for both heads so that the medium facing surface 12a of the head of the second type will not come into contact with the surface of the magnetic disk and the read output provided by the MR element 22 will be maximized. In the experiment, the value of the current supplied to the coil 32 was set to 60 mA, and the value of the current supplied to the laser diode 60 was set to 45 mA.

Then, with the currents supplied to the coil 32 and the laser diode 60 set at the values as specified above, the value of the power supplied to the heater 47 was increased in a predetermined stepwise manner from zero so as to gradually increase the amount of protrusion of part of the medium facing surface 12a, and the value of the power (in mW) at which the medium facing surface 12a came into contact with the surface of the magnetic disk was determined. Hereinafter, this power value will be denoted as WTD. Note that the read output of the MR element 22 is saturated when the medium facing surface 12a comes into contact with the surface of the magnetic disk. To determine WTD, the contact of the medium facing surface 12a with the surface of the magnetic disk was detected by detecting the saturation of the read output of the MR element 22.

When the laser diode 60 is activated as described above, part of the energy of the laser light propagating through the core 43 is transformed into heat in the plasmon generator 40, and the heat causes a volumetric expansion of the plasmon generator 40. Accordingly, the flying height obtained under this condition is smaller by the amount of protrusion of the plasmon generator 40 than the flying height obtained with the laser diode 60 inactivated. For this reason, WTD is smaller than RTD. In the experiment, the difference between RTD and WTD multiplied by the spacing adjustment amount was considered as the amount of protrusion of the plasmon generator 40 from the medium facing surface 12a during use of the thermally-assisted magnetic recording head 1, and is denoted as TPGP (in nm).

Furthermore, in the experiment, thermally-assisted magnetic recording was performed using the heads of the first and second types to determine the read output (in mV) of the MR element 22 of each of the heads. To determine the read output, the coil 32 and the laser diode 60 were driven under the pre-optimized conditions described above. The power value employed for the heater 47 to determine the read output was the value immediately before the medium facing surface 12a came into contact with the surface of the magnetic disk, that is, the value immediately before (one step before) the value at which the read output was saturated (WTD). Accordingly, the read output determined in the experiment can be said to be the maximum output that is obtained under the conditions under which the medium facing surface 12a does not come into contact with the surface of the magnetic disk.

To fabricate the head of the first type, the power value (hereinafter referred to as the laser power) of the laser diode to emit the laser light to be introduced into the core 43 in the step of causing a volumetric expansion of the preliminary plasmon generator 40P was varied in 5 mW increments within the range from 15 mW to 40 mW. The laser light was emitted for a duration of one second from the laser diode in this step.

Table 1 shows the results of the experiment. Note that in Table 1, the entries in the laser power column with no numerical value given are indicative of the data of the head of the second type. Furthermore, "Material" in Table 1 shows the material of the plasmon generator 40.

TABLE 1

| Material | Laser power (mW) | TPGP (nm) | Read output (mV) |
| --- | --- | --- | --- |
| Au | — | 14.2 | 11.5 |
| | 15 | 12.3 | 11.7 |
| | 20 | 11.5 | 11.3 |
| | 25 | 10.2 | 10.5 |
| | 30 | 9.5 | 9.5 |
| | 35 | 8.3 | 7.6 |
| | 40 | 6.8 | 1.1 |
| Ag | — | 10.4 | 11.6 |
| | 15 | 9.2 | 11.9 |
| | 20 | 7.8 | 11.7 |
| | 25 | 7.0 | 11.4 |
| | 30 | 5.8 | 10.7 |
| | 35 | 4.9 | 9.4 |
| | 40 | 3.7 | 4.7 |
| Cu | — | 7.2 | 11.5 |
| | 15 | 6.7 | 11.4 |
| | 20 | 5.6 | 11.3 |
| | 25 | 4.6 | 10.9 |
| | 30 | 3.6 | 10.5 |
| | 35 | 2.8 | 8.8 |
| | 40 | 2.3 | 3.7 |

Table 1 shows that TPGP of the head of the first type is smaller than that of the head of the second type. As can be seen from this result, the present embodiment allows reducing TPGP, that is, the amount of protrusion of the plasmon generator 40 during use of the thermally-assisted magnetic recording head 1, as compared with the case where the plasmon generator 40 is completed by polishing the surface 12Pa without introducing laser light into the core 43.

Note that an increase in the laser power increases the amount of volumetric expansion of the preliminary plasmon generator 40P, and consequently reduces the density of the plasmon generator 40. An excessive reduction in the density of the plasmon generator 40 reduces the efficiency of excitation of the surface plasmons 73 on the plasmon exciting part 401 (the flat surface 42b) and also reduces the efficiency of propagation of the surface plasmons 73 on the flat surface 42b, thereby causing a reduction in the efficiency of generation of the near-field light 74. As a result, the magnetic recording layer of the magnetic disk 201 cannot be sufficiently heated, so that the writing capability of the thermally-assisted magnetic recording head 1 is degraded. In Table 1, the decrease in read output with increasing laser power is indicative of the degradation in the writing capability due to the aforementioned phenomenon. Accordingly, the laser power preferably has such a magnitude that the read output will not significantly decrease. In the example shown in Table 1, the laser power is preferably 30 mW or less for any material.

The experiment employed Au, Ag, and Cu as the materials of the plasmon generators 40; however, the present invention is applicable not only to cases where the plasmon generator 40 is formed of these materials but also to any cases where the plasmon generator 40 is formed of a metal material that expands in volume due to heat.

The other effects provided by the present embodiment will now be described. The plasmon generator 40 of the present embodiment includes the base part 41 and the protruding part 42. Of these parts, it is the protruding part 42 that mainly contributes to the excitation of surface plasmons. Heat is therefore generated at the protruding part 42. More specifically, a greater amount of heat is generated in an area of the protruding part 42 near the flat surface 42b. The base part 41 is contiguous with the protruding part 42 and extends in the Y direction more than the protruding part 42 does. Accordingly, the base part 41 functions as a heat sink for dissipating the heat generated at the protruding part 42 outward from the plasmon generator 40. This allows the plasmon generator 40 to be prevented from excessively increasing in temperature.

In the present embodiment, the magnetic pole 35 located near the protruding part 42 also functions as a heat sink for dissipating the heat generated at the protruding part 42 outward from the plasmon generator 40. This also allows the plasmon generator 40 to be prevented from excessively increasing in temperature.

Modification Examples

Now, with reference to FIG. 10A, FIG. 10B, FIG. 11A, and FIG. 11B, a description will be given of first and second modification examples of the method of manufacturing the thermally-assisted magnetic recording head 1 according to the present embodiment. According to the first and second modification examples, in the step of producing a plurality of sliders 10, the substructure is first cut into a plurality of slider aggregates 110 each of which includes a plurality of pre-slider portions 10P aligned in a row. Next, the cut surfaces of each slider aggregate 110 are subjected to primary polishing to provide the plurality of pre-slider portions 10P included in the slider aggregate 110 with the surfaces to be polished 11Pa and 12Pa.

Figure 10A:
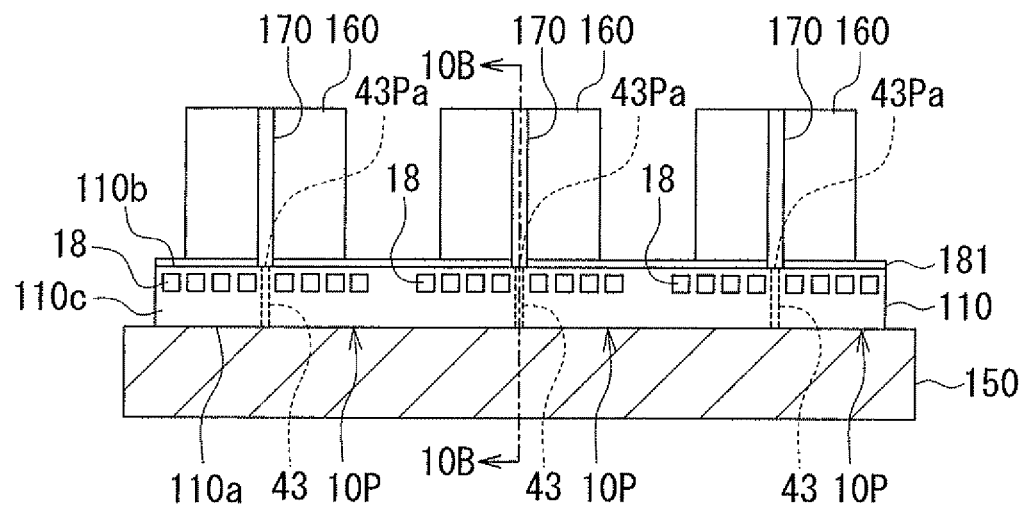
FIG. 10A and FIG. 10B are explanatory diagrams showing a step of a first modification example of the method of manufacturing the thermally-assisted magnetic recording head according to the first embodiment of the invention.
Figure 10B:
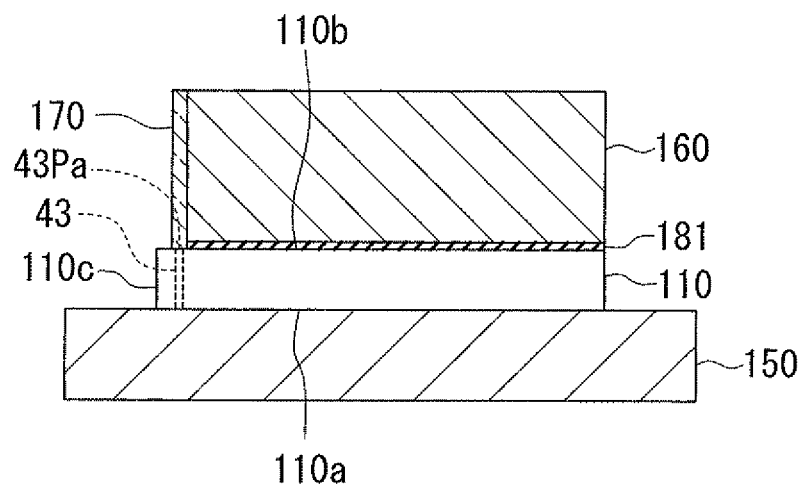
Figure 11A:
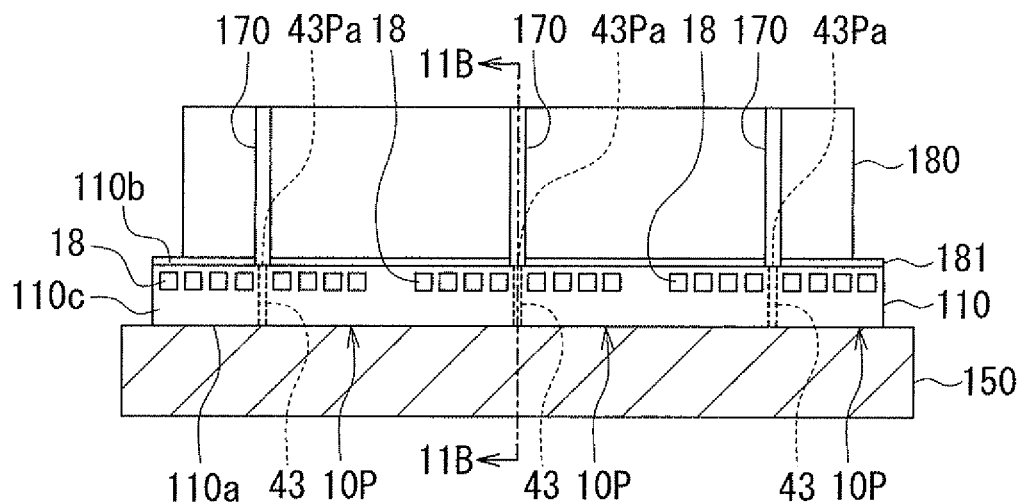
FIG. 11A and FIG. 11B are explanatory diagrams showing a step of a second modification example of the method of manufacturing the thermally-assisted magnetic recording head according to the first embodiment of the invention.
Figure 11B:
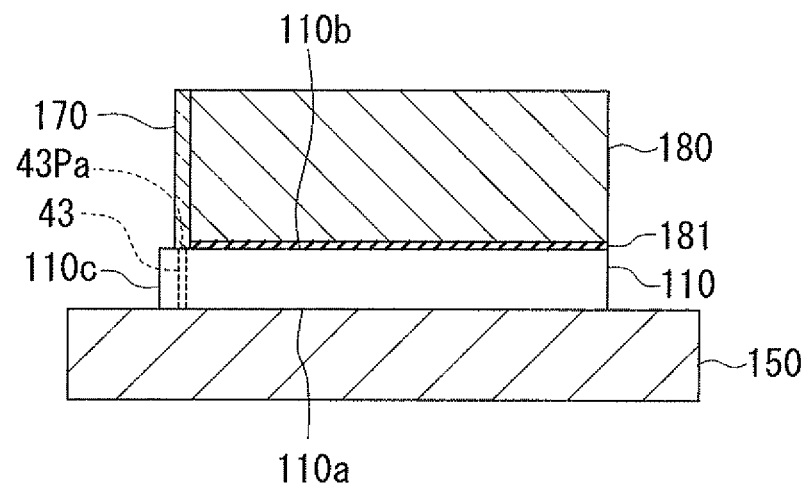

FIG. 10A is a front view showing a step that follows the formation of the surfaces to be polished 11Pa and 12Pa according to the first modification example. FIG. 10B shows a cross section taken along line 10B-10B of FIG. 10A. FIG. 11A is a front view showing a step that follows the formation of the surfaces to be polished 11Pa and 12Pa according to the second modification example. FIG. 11B shows a cross section taken along line 11B-11B of FIG. 11A. The slider aggregate 110 has a surface 110a including the surfaces to be polished 11Pa and 12Pa of the plurality of pre-slider portions 10P, a surface 110b opposite to the surface 110a, and a surface 110c that is composed of the top surfaces of the protective layers 17 of the plurality of pre-slider portions 10P. The surface 110b includes the surfaces 11Pb and 12Pb of the plurality of pre-slider portions 10P. The preliminary incidence ends 43Pa of the cores 43 of the plurality of pre-slider portions 10P are located in the surface 110b. The plurality of terminals 18 of the plurality of pre-slider portions 10P are disposed on the surface 110c. Although not shown in the drawings, the end faces 40Pa of the preliminary plasmon generators 40P of the plurality of pre-slider portions 10P are located in the surface 110a.

In the first modification example, as shown in FIG. 10A and FIG. 10B, the slider aggregate 110 is configured to be held by a plurality of jigs 160 with the surface 110b attached to the bottom surfaces of the jigs 160 with an attaching material 181, so that the surface 110a comes into contact with the top surface of the lapping plate 150 or the pad. The attaching material 181 may be the same as the attaching material 161. Each of the jigs 160 is provided with an optical fiber 170 that extends in the vertical direction. The lower ends of the optical fibers 170 are positioned to be opposed to the preliminary incidence ends 43Pa of the cores 43 of the preliminary head sections 12P.

In the second modification example, as shown in FIG. 11A and FIG. 11B, the slider aggregate 110 is configured to be held by a single jig 180 with the surface 110b attached to the bottom surface of the jig 180 with the attaching material 181, so that the surface 110a comes into contact with the top surface of the lapping plate 150 or the pad. The jig 180 is provided with a plurality of optical fibers 170 that extend in the vertical direction. The lower ends of the optical fibers 170 are positioned to be opposed to the preliminary incidence ends 43Pa of the cores 43 of the preliminary head sections 12P.

In the first and second modification examples, as shown in FIG. 10A, FIG. 10B, FIG. 11A, and FIG. 11B, laser light is first introduced into the cores 43 of the plurality of pre-slider portions 10P to cause a volumetric expansion of the preliminary plasmon generators 40P with heat. Next, the surface 110a is subjected to secondary polishing with the preliminary plasmon generators 40P expanded in volume. This causes the end faces 40Pa of the preliminary plasmon generators 40P to be polished into the front end faces 402, thereby making the preliminary plasmon generators 40P into the plasmon generators 40.

Then, in the first modification example, the slider aggregate 110 is released from the plurality of jigs 160, while in the second modification example, the slider aggregate 110 is released from the jig 180. In the first and second modification examples, the slider aggregate 110 is then cut to separate the plurality of pre-slider portions 10P from each other. Then, in the same manner as the step shown in FIG. 8A, FIG. 8B, and FIG. 9, the surface 12Pb of the pre-slider portion 10P is processed into the rear surface 12b to complete the slider 10. Note that before the plurality of pre-slider portions 10P are separated from each other, the surfaces 12Pb of the plurality of pre-slider portions 10P may be processed into the rear surfaces 12b.

According to the first and second modification examples, the medium facing surfaces 11a and 12a of a plurality of pre-slider portions 10P are formed at the same time. This makes it possible to improve the production efficiency of the thermally-assisted magnetic recording head 1. Furthermore, in the first modification example, loads of different magnitude may be applied to the plurality of jigs 160. This allows the positions of the medium facing surfaces 11a and 12a to be accurately defined in each pre-slider portion 10P.

Second Embodiment

Figure 15:
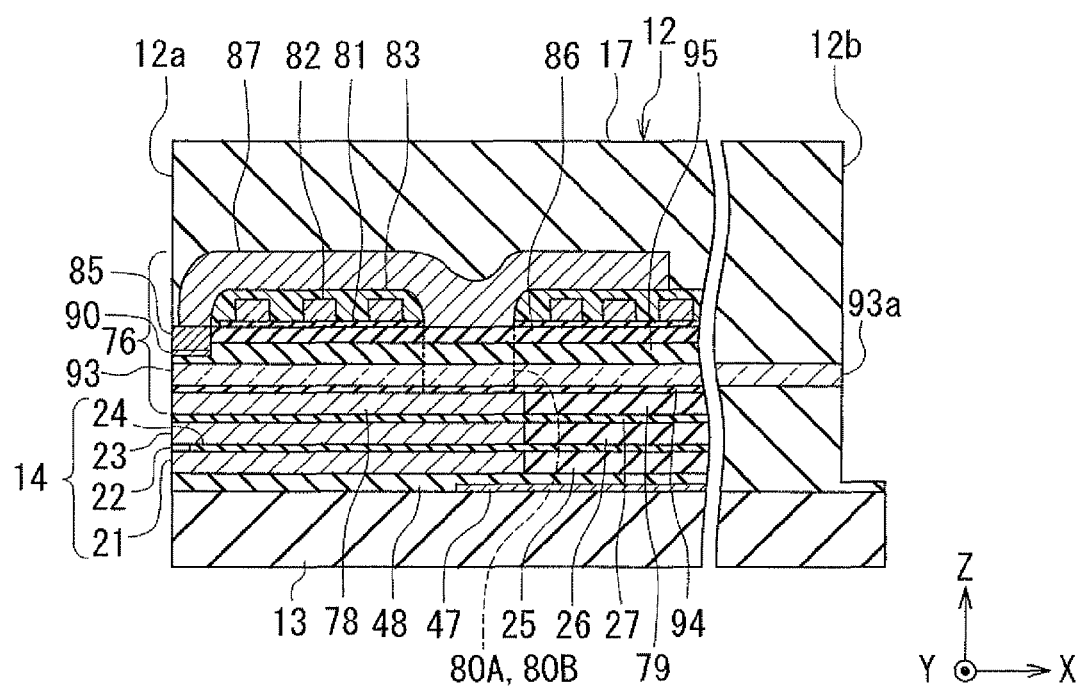
FIG. 15 is a cross-sectional view showing the head section of the thermally-assisted magnetic recording head according to the second embodiment of the invention.

A second embodiment of the present invention will now be described. First, reference is made to FIG. 15 to describe the configuration of the thermally-assisted magnetic recording head according to the present embodiment. FIG. 15 is a cross-sectional view showing the main part of the thermally-assisted magnetic recording head according to the present embodiment. The head section 12 of the present embodiment has a write head section 76 in place of the write head section 16 of the first embodiment.

The write head section 76 of the present embodiment includes a return yoke layer 78 disposed on the insulating layer 27, and an insulating layer 79 disposed on the insulating layer 27 and surrounding the return yoke layer 78. The return yoke layer 78 is made of a soft magnetic material. The return yoke layer 78 has an end face located in the medium facing surface 12a. The top surfaces of the return yoke layer 78 and the insulating layer 79 are even with each other.

The write head section 76 further includes two coupling portions 80A and 80B located away from the medium facing surface 12a and disposed on a portion of the return yoke layer 78. The coupling portions 80A and 80B are made of a soft magnetic material. Each of the coupling portions 80A and 80B includes a first layer located on the return yoke layer 78 and a second layer located on the first layer.

The write head section 76 further includes a waveguide including a core 93 and a cladding. The cladding surrounds the core 93. The cladding includes cladding layers 94 and 95. The cladding layer 94 is disposed over the return yoke layer 78 and the insulating layer 79. The core 93 is disposed on the cladding layer 94. The cladding layer 95 covers the cladding layer 94 and the core 93. The core 93 extends in the direction perpendicular to the medium facing surface 12a (the X direction). The core 93 has an incidence end 93a, an end face closer to the medium facing surface 12a, a top surface, a bottom surface, and two side surfaces. The end face of the core 93 may be located in the medium facing surface 12a or away from the medium facing surface 12a. FIG. 15 shows an example in which the end face of the core 93 is located in the medium facing surface 12a. The core 93 propagates laser light that is emitted from the laser diode 60 of the first embodiment shown in FIG. 5 and FIG. 6 and incident on the incidence end 93a. The core 93 is made of the same material as that of the core 43 of the first embodiment. The cladding layers 94 and 95 are made of the same material as that of the cladding layers 44, 45 and 46 of the first embodiment.

The first layers of the coupling portions 80A and 80B are embedded in the cladding layers 94 and 95. The first layer of the coupling portion 80A and the first layer of the coupling portion 80B are located on opposite sides of the core 93 in the track width direction TW, each being spaced from the core 93.

The write head section 76 further includes a plasmon generator 90 disposed above the core 93 in the vicinity of the medium facing surface 12a, and a magnetic pole 85 disposed at such a position that the plasmon generator 90 is interposed between the magnetic pole 85 and the core 93. The magnetic pole 85 has a top surface that is located at a level higher than the top surface of the cladding layer 95. The plasmon generator 90 is made of the same material as that of the plasmon generator 40 of the first embodiment. The magnetic pole 85 is made of a soft magnetic material, or a magnetic metal material in particular. The shapes and the arrangement of the core 93, the plasmon generator 90, and the magnetic pole 85 will be described in detail later.

The write head section 76 further includes an insulating layer 86 disposed on the cladding layer 95 and surrounding the magnetic pole 85. The second layers of the coupling portions 80A and 80B are embedded in the insulating layer 86.

The write head section 76 further includes an insulating layer 81 disposed on the insulating layer 86, a coil 82 disposed on the insulating layer 81, and an insulating layer 83 covering the coil 82. The coil 82 is planar spiral-shaped and wound around the coupling portions 80A and 80B. The coil 82 produces a magnetic field corresponding to data to be written on the magnetic disk 201. The coil 82 is made of a conductive material such as copper.

The write head section 76 further includes a yoke layer 87. The yoke layer 87 is disposed over the magnetic pole 85, the insulating layer 83 and the coupling portions 80A and 80B. The yoke layer 87 is in contact with the top surface of the magnetic pole 85 at a position near the medium facing surface 12a, and in contact with the top surfaces of the coupling portions 80A and 80B at a position away from the medium facing surface 12a. The yoke layer 87 is made of a soft magnetic material.

In the write head section 76, a magnetic path for passing a magnetic flux corresponding to the magnetic field produced by the coil 82 is formed by the return yoke layer 78, the coupling portions 80A and 80B, the yoke layer 87, and the magnetic pole 85. The magnetic pole 85 has a front end face located in the medium facing surface 12a. The magnetic pole 85 allows the magnetic flux corresponding to the magnetic field produced by the coil 82 to pass, and produces a write magnetic field for writing data on the magnetic disk 201.

Figure 12:
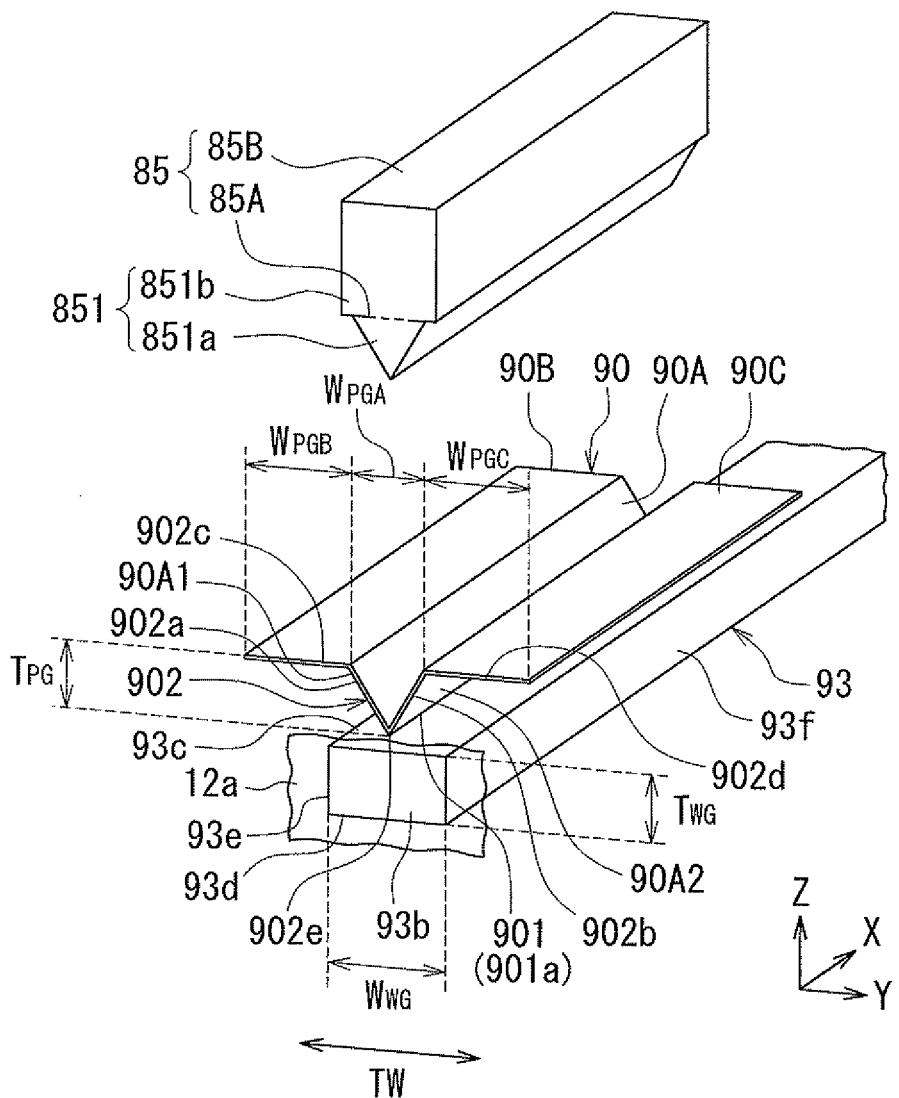
FIG. 12 is a perspective view showing the core of a waveguide, a plasmon generator, and a magnetic pole in a thermally-assisted magnetic recording head according to a second embodiment of the invention.
Figure 13:
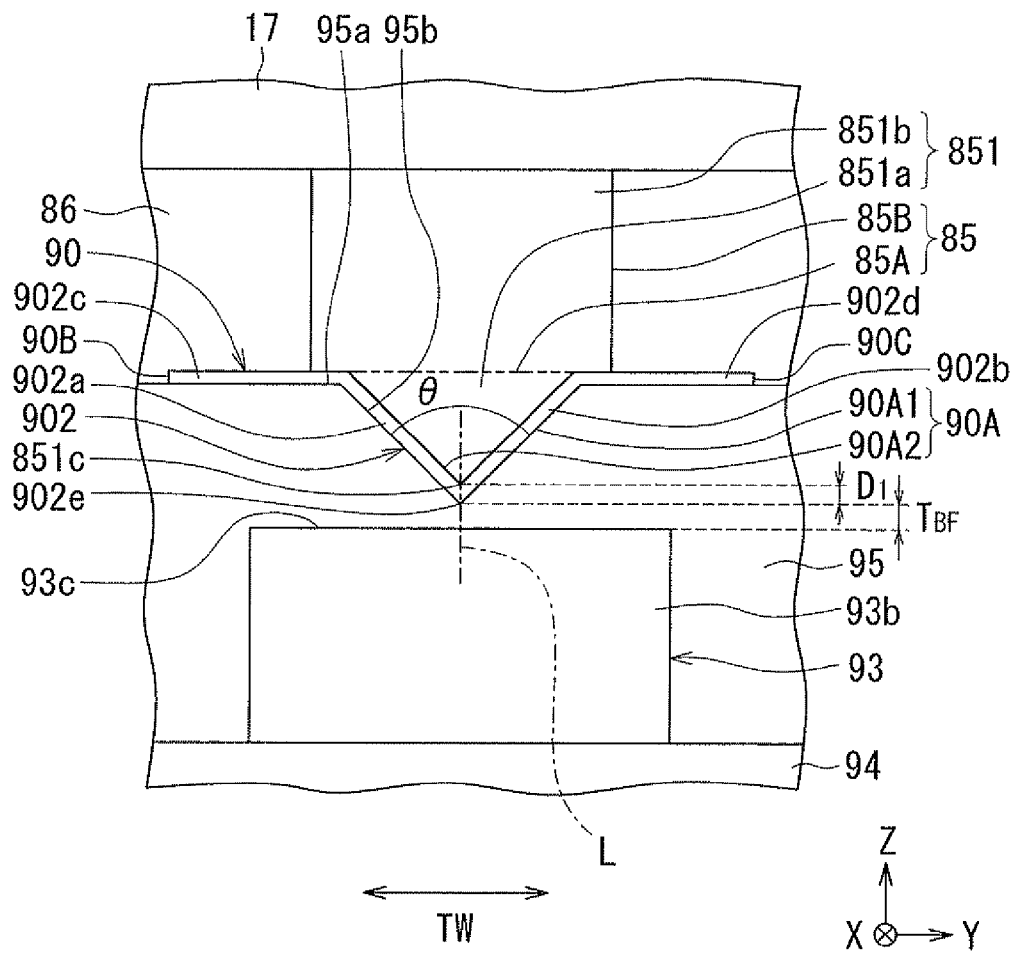
FIG. 13 is a front view showing part of the medium facing surface of a head section of the thermally-assisted magnetic recording head according to the second embodiment of the invention.
Figure 14:
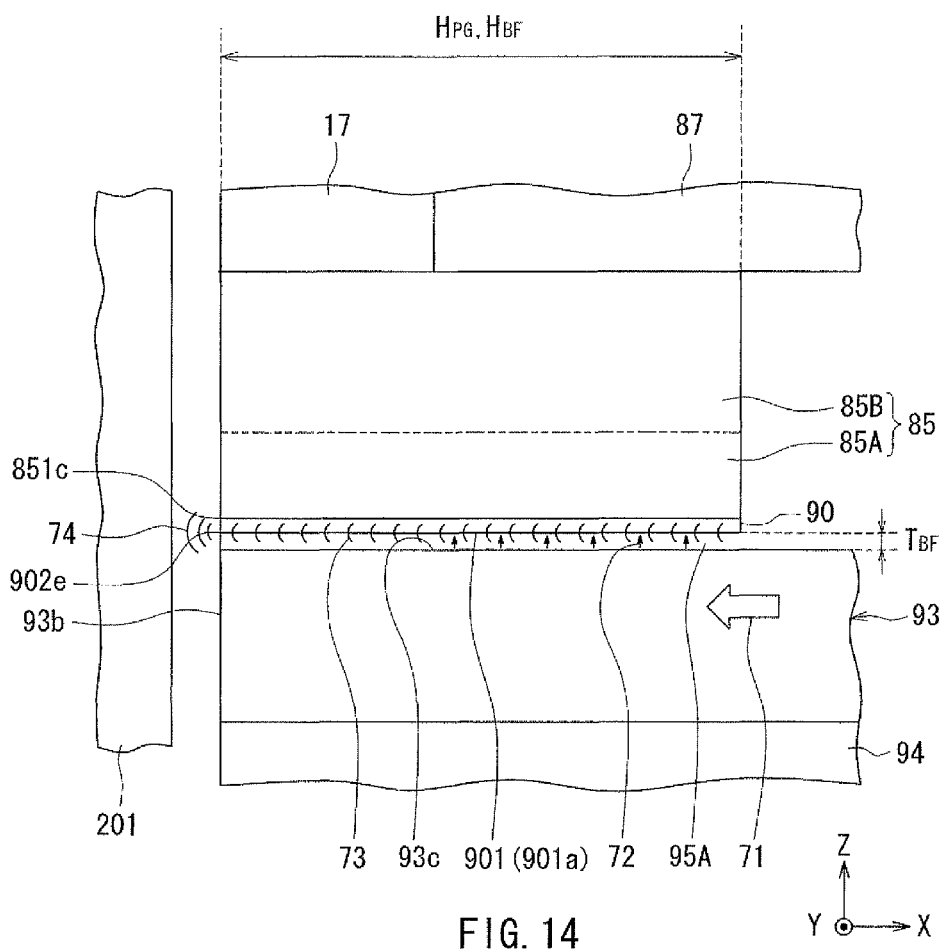
FIG. 14 is a cross-sectional view showing the core of the waveguide, the plasmon generator, and the magnetic pole of the thermally-assisted magnetic recording head according to the second embodiment of the invention.

Now, with reference to FIG. 12 to FIG. 14, a description will be given of an example of the shapes and the arrangement of the core 93, the plasmon generator 90, and the magnetic pole 85. FIG. 12 is a perspective view showing the core 93, the plasmon generator 90, and the magnetic pole 85. FIG. 13 is a front view showing part of the medium facing surface 12a of the head section 12. FIG. 14 is a cross-sectional view showing the core 93, the plasmon generator 90, and the magnetic pole 85. Note that FIG. 12 illustrates an exploded view of the plasmon generator 90 and the magnetic pole 85.

As shown in FIG. 12, the core 93 has an end face 93b that is closer to the medium facing surface 12a, an evanescent light generating surface 93c which is a top surface, a bottom surface 93d, and two side surfaces 93e and 93f, as well as the incidence end 93a shown in FIG. 15. The evanescent light generating surface 93c generates evanescent light based on the light propagating through the core 93. FIG. 12 to FIG. 14 illustrate an example in which the end face 93b is located in the medium facing surface 12a; however, the end face 93b may be located away from the medium facing surface 12a.

As shown in FIG. 13, the cladding layer 95 has a top surface 95a located above the core 93, and a groove 95b that opens in the top surface 95a and is located above the core 93. The groove 95b extends in the direction perpendicular to the medium facing surface 12a (the X direction). The groove 95b is V-shaped in cross section parallel to the medium facing surface 12a.

As shown in FIG. 12 to FIG. 14, the plasmon generator 90 has an outer surface that includes a plasmon exciting part 901 and a front end face 902. The plasmon exciting part 901 faces the evanescent light generating surface 93c of the core 93 with a predetermined spacing therebetween. The front end face 902 is located in the medium facing surface 12a. Surface plasmons are excited on the plasmon exciting part 901 through coupling with the evanescent light generated from the evanescent light generating surface 93c. As shown in FIG. 14, the cladding layer 95 has a portion interposed between the evanescent light generating surface 93c and the plasmon exciting part 901, and this portion of the cladding layer 95 forms a buffer part 95A that has a refractive index lower than that of the core 93.

As shown in FIG. 12 and FIG. 13, the plasmon generator 90 has a V-shaped portion 90A that has an end face located in the medium facing surface 12a. The V-shaped portion 90A extends in the direction perpendicular to the medium facing surface 12a (the X direction). The groove 95b mentioned above is to accommodate the V-shaped portion 90A.

The V-shaped portion 90A has a first sidewall part 90A1 and a second sidewall part 90A2 that are each connected to the plasmon exciting part 901 and that increase in distance from each other with increasing distance from the plasmon exciting part 901. The first and second sidewall parts 90A1 and 90A2 are each shaped like a plate. The first and second sidewall parts 90A1 and 90A2 are connected to each other so that the connected first and second sidewall parts 90A1 and 90A2 have a V-shaped cross section parallel to the medium facing surface 12a.

The plasmon generator 90 further has an extended portion 90B that is connected to an edge of the first sidewall part 90A1 opposite from the plasmon exciting part 901, and an extended portion 90C that is connected to an edge of the second sidewall part 90A2 opposite from the plasmon exciting part 901. From the edge of the first sidewall part 90A1 opposite from the plasmon exciting part 901, the extended portion 90B extends parallel to the evanescent light generating surface 93c and away from both the first and second sidewall parts 90A1 and 90A2 (in the −Y direction). From the edge of the second sidewall part 90A2 opposite from the plasmon exciting part 901, the extended portion 90C extends parallel to the evanescent light generating surface 93c and away from both the first and second sidewall parts 90A1 and 90A2 (in the Y direction). As viewed from above, the outer edges of the extended portions 90B and 90C lie outside the outer edges of the magnetic pole 85.

The plasmon exciting part 901 has a propagative edge 901a that lies at an end of the connected first and second sidewall parts 90A1 and 90A2 closer to the evanescent light generating surface 93c. In the example shown in FIG. 14, the entire plasmon exciting part 901 is composed of the propagative edge 901a.

The front end face 902 includes a first portion 902a and a second portion 902b that lie at respective ends of the first and second sidewall parts 90A1 and 90A2 and are connected to each other into a V-shape, a third portion 902c that lies at an end of the extended portion 90B, a fourth portion 902d that lies at an end of the extended portion 90C, and a near-field light generating part 902e that lies at an end of the plasmon exciting part 901 (propagative edge 901a). The near-field light generating part 902e generates near-field light based on the surface plasmons excited on the plasmon exciting part 901.

The magnetic pole 85 has a first portion 85A and a second portion 85B. The first portion 85A is accommodated in the space defined by the V-shaped portion 90A (the first and second sidewall parts 90A1 and 90A2) of the plasmon generator 90. The second portion 85B is located farther from the evanescent light generating surface 93c of the core 93 than is the first portion 85A. In FIG. 12 to FIG. 14, the boundary between the first portion 85A and the second portion 85B is shown by a chain double-dashed line.

The first portion 85A is triangular-prism-shaped. The first portion 85A is interposed between the first and second sidewall parts 90A1 and 90A2 of the V-shaped portion 90A of the plasmon generator 90, and is in contact with the first and second sidewall parts 90A1 and 90A2. The width of the first portion 85A in the direction parallel to the medium facing surface 12a and the evanescent light generating surface 93c (the Y direction) is constant or almost constant regardless of the distance from the medium facing surface 12a.

The second portion 85B is rectangular-solid-shaped, and is in contact with the extended portions 90B and 90C of the plasmon generator 90. The width of the second portion 85B in the direction parallel to the medium facing surface 12a and the evanescent light generating surface 93c (the Y direction) is constant regardless of the distance from the medium facing surface 12a, and is greater than the width of the first portion 85A.

As shown in FIG. 12 and FIG. 13, the magnetic pole 85 has an end face 851 located in the medium facing surface 12a. The end face 851 includes a first portion 851a and a second portion 851b. The first portion 851a is the end face of the first portion 85A. The second portion 851b is the end face of the second portion 85B. The first portion 851a has a triangular shape and is interposed between the first and second portions 902a and 902b of the front end face 902 of the plasmon generator 90. The first portion 851a has a tip 851c located at its bottom end.

As shown in FIG. 12, the width of the core 93 in the track width direction TW (the Y direction) in the vicinity of the plasmon generator 90 will be represented by symbol $W_{WG}$. The thickness (dimension in the Z direction) of the core 93 in the vicinity of the plasmon generator 90 will be represented by symbol $T_{WG}$. $W_{WG}$ falls within the range of 0.3 to 100 μm, for example. $T_{WG}$ falls within the range of 0.1 to 4 μm, for example. The core 93 excluding the part in the vicinity of the plasmon generator 90 may have a width greater than $W_{WG}$.

As shown in FIG. 12, the dimension of the first and second portions 902a and 902b of the front end face 902 of the plasmon generator 90 in the track width direction TW (the Y direction) will be represented by symbol $W_{PGA}$. The dimension of the first and second portions 902a and 902b in the Z direction will be represented by symbol $T_{PG}$. Both $W_{PGA}$ and $T_{PG}$ are sufficiently smaller than the wavelength of the laser light to propagate through the core 93. The dimension of the first and second sidewall parts 90A1 and 90A2 in the direction perpendicular to the evanescent light generating surface 93c (the Z direction) is equal to $T_{PG}$. $T_{PG}$ falls within the range of 200 to 400 nm, for example.

$W_{PGA}$ is determined by $T_{PG}$ and the angle θ formed between the two surfaces of the V-shaped portion 90A on opposite sides in the track width direction TW (see FIG. 13). More specifically, $W_{PGA} = 2 \times T_{PG} \times \tan(\theta/2)$. The angle θ falls within the range of 30 to 120 degrees, for example.

As shown in FIG. 12, the widths of the third portion 902c and the fourth portion 902d of the front end face 902 of the plasmon generator 90 in the track width direction TW (the Y direction) will be represented by symbols $W_{PGB}$ and $W_{PGC}$, respectively. In the present embodiment, $W_{PGB}$ and $W_{PGC}$ are equal. $W_{PGB}$ and $W_{PGC}$ fall within the range of 0.5 to 20 μm, for example. In FIG. 12, each of the extended portions 90B and 90C is illustrated as if the width thereof is constant regardless of the distance from the medium facing surface 12a. However, the extended portions 90B and 90C may have widths that become greater than $W_{PGB}$ and the $W_{PGC}$, respectively, at a position apart from the medium facing surface 12a.

As shown in FIG. 14, the length of the plasmon generator 90 in the X direction will be represented by symbol $H_{PG}$. $H_{PG}$ falls within the range of 0.6 to 4.0 µm, for example. The X-direction length of a portion of the plasmon exciting part 901 of the plasmon generator 90, the portion facing the evanescent light generating surface 93c, will be represented by symbol $H_{BF}$. The distance between the plasmon exciting part 901 and the evanescent light generating surface 93c will be represented by symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 µm, and is preferably greater than the wavelength of the laser light to propagate through the core 93. In the example shown in FIG. 14, the end face 93b of the core 93 is located in the medium facing surface 12a, so that $H_{BF}$ is equal to $H_{PG}$. $T_{BF}$ preferably falls within the range of 10 to 100 nm. As shown in FIG. 13, the distance between the near-field light generating part 902e of the front end face 902 of the plasmon generator 90 and the end face 93b of the core 93 is equal to $T_{BF}$.

As shown in FIG. 13, the distance between the near-field light generating part 902e of the front end face 902 of the plasmon generator 90 and the tip 851c of the first portion 851a of the end face 851 of the magnetic pole 85 will be represented by symbol $D_1$. The dimension of the front end face 902 on a virtual straight line L is equal to $D_1$, the virtual straight line L passing through the near-field light generating part 902e and extending in the direction perpendicular to the evanescent light generating surface 93c. $D_1$ falls within the range of 20 to 70 nm, for example.

The thermally-assisted magnetic recording head 1 according to the present embodiment is manufactured by the same method as in the first embodiment.

Reference is now made to FIG. 14 to describe the principle of generation of near-field light in the present embodiment. The principle of generation of near-field light in the present embodiment is basically the same as that in the first embodiment. More specifically, the laser light 71 emitted from the laser diode 60 of the first embodiment shown in FIG. 5 and FIG. 6 propagates through the core 93 of the waveguide to reach the vicinity of the plasmon generator 90. Here, the laser light 71 is totally reflected at the evanescent light generating surface 93c. This causes evanescent light 72 to occur from the evanescent light generating surface 93c to permeate into the buffer part 95A. Then, surface plasmons 73 are excited on the plasmon exciting part 901 (the propagative edge 901a) of the outer surface of the plasmon generator 90 through coupling with the evanescent light 72. The surface plasmons 73 propagate along the propagative edge 901a to the near-field light generating part 902e. Consequently, the surface plasmons 73 concentrate at the near-field light generating part 902e, and near-field light 74 is generated from the near-field light generating part 902e based on the surface plasmons 73.

The effects of the thermally-assisted magnetic recording head 1 according to the present embodiment will now be described. In the present embodiment, the plasmon generator 90 has the V-shaped portion 90A and the extended portions 90B and 90C. Like the base part 41 of the plasmon generator 40 of the first embodiment, the extended portions 90B and 90C function as a heat sink for dissipating heat generated at the V-shaped portion 90A outward from the plasmon generator 90. According to the present embodiment, it is thereby possible to prevent the plasmon generator 90 from excessively increasing in temperature.

In the present embodiment, in particular, the magnetic pole 85 is in contact with the plasmon generator 90. The magnetic pole 85 is also in contact with the yoke layer 87 having a high volume. The magnetic pole 85 is made of a magnetic metal material which is higher in thermal conductivity than insulating materials such as alumina. Consequently, according to the present embodiment, it is possible to effectively dissipate heat generated by the plasmon generator 90 through the magnetic pole 85 and the yoke layer 87. This allows the effect of preventing an excessive increase in temperature of the plasmon generator 90 to be exerted remarkably.

In the present embodiment, the plasmon generator 90 made of metal is in contact with the magnetic pole 85 made of a magnetic metal material. The plasmon generator 90 is thus not electrically isolated. According to the present embodiment, it is therefore possible to avoid the occurrence of electrical static discharge (ESD) in the plasmon generator 90.

In the present embodiment, the magnetic pole 85 is disposed such that the plasmon generator 90 is interposed between the magnetic pole 85 and the core 93. With such a configuration, according to the present embodiment, the end face 851 of the magnetic pole 85 for generating a write magnetic field and the near-field light generating part 902e of the plasmon generator 90 for generating near-field light can be put close to each other in the medium facing surface 12a. This makes it possible to provide an advantageous configuration for thermally-assisted magnetic recording. Moreover, according to the present embodiment, since the plasmon generator 90 made of a nonmagnetic metal is interposed between the core 93 and the magnetic pole 85, it is possible to prevent the laser light propagating through the core 93 from being absorbed by the magnetic pole 85. This can improve the use efficiency of the laser light propagating through the core 93.

The end face 851 of the magnetic pole 85 located in the medium facing surface 12a has the first portion 851a which is a triangular portion interposed between the first and second portions 902a and 902b of the front end face 902 of the plasmon generator 90. The first portion 851a has the tip 851c located at its bottom end. In the first portion 851a, the tip 851c is closest to the return yoke layer 78. Magnetic fluxes therefore concentrate at the vicinity of the tip 851c of the first portion 851a, so that a high write magnetic field occurs from the vicinity of the tip 851c. Consequently, according to the present embodiment, the position where a high write magnetic field occurs in the first portion 851a can be brought closer to the near-field light generating part 902e of the plasmon generator 90 which generates near-field light. According to the present embodiment, it is thus possible to put the position of occurrence of the write magnetic field and the position of occurrence of the near-field light close to each other while preventing the laser light propagating through the core 93 from being absorbed by the magnetic pole 85.

In the present embodiment, the shapes and the arrangement of the core 93, the plasmon generator 90, and the magnetic pole 85 are not limited to the example that has been described with reference to FIG. 12 to FIG. 14. For example, the plasmon generator 90 may be without the extended portions 90B and 90C. The plasmon generator 90 may have a triangular-prism-shaped portion in place of the V-shaped portion 90A. The plasmon generator 90 may have a flat surface portion in place of the propagative edge 901a. The flat surface portion may include a width changing portion. In the width changing portion, the width in the direction parallel to the medium facing surface 12a and the evanescent light generating surface 93c (the Y direction) decreases with increasing proximity to the medium facing surface 12a. Alternatively, the plasmon generator 90 may have a propagative edge, and a flat surface portion that is located farther from the medium facing surface 12a than is the propagative edge and connected to the propagative edge.

The remainder of configuration, function and effects of the present embodiment are similar to those of the first embodiment.

The present invention is not limited to the foregoing embodiments, and various modifications may be made thereto. For example, in the first embodiment, the magnetic pole 35 and the core 43 are located above plasmon generator 40; however, in the present invention, the magnetic pole 35 and the core 43 may be located below the plasmon generator 40. In this case, the protruding part 42 of the plasmon generator 40 protrudes downward from the bottom surface of the base part 41.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a thermally-assisted magnetic recording head, the thermally-assisted magnetic recording head comprising: a medium facing surface that faces a magnetic recording medium; a magnetic pole; a waveguide; and a plasmon generator, wherein:
    the magnetic pole produces a write magnetic field for writing data on the magnetic recording medium;
    the waveguide includes a core through which light propagates, and a cladding that surrounds the core, the core having an evanescent light generating surface that generates evanescent light based on the light propagating through the core;
    the plasmon generator has an outer surface that includes a plasmon exciting part and a front end face, the plasmon exciting part facing the evanescent light generating surface with a predetermined spacing therebetween, the front end face being located in the medium facing surface and including a near-field light generating part that generates near-field light; and
    the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon, the method comprising the steps of:
forming a preliminary head section that has a surface to be polished and includes the magnetic pole, the waveguide, and a preliminary plasmon generator;
causing a volumetric expansion of the preliminary plasmon generator with heat by introducing light into the core of the waveguide of the preliminary head section; and
polishing the surface to be polished of the preliminary head section into the medium facing surface, wherein
the preliminary plasmon generator has an end face that is located in the surface to be polished, and
in the step of polishing the surface to be polished, the surface to be polished is subjected to polishing with the preliminary plasmon generator expanded in volume, whereby the end face of the preliminary plasmon generator is polished into the front end face, and the preliminary plasmon generator thereby becomes the plasmon generator.

2. The method of manufacturing the thermally-assisted magnetic recording head according to claim 1, wherein, in the step of causing a volumetric expansion of the preliminary plasmon generator, the preliminary plasmon generator is made to have a temperature of 400° C.

3. The method of manufacturing the thermally-assisted magnetic recording head according to claim 1, wherein the plasmon generator is formed of one of Au, Ag, and Cu.

* * * * *